(12) United States Patent
Kim

(10) Patent No.: US 11,562,579 B2
(45) Date of Patent: Jan. 24, 2023

(54) METHOD FOR CONTROLLING AUTONOMOUS VEHICLE

(71) Applicant: LG Electronics Inc., Seoul (KR)

(72) Inventor: Soryoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 692 days.

(21) Appl. No.: 16/490,493

(22) PCT Filed: May 21, 2019

(86) PCT No.: PCT/KR2019/006085
§ 371 (c)(1),
(2) Date: Aug. 30, 2019

(87) PCT Pub. No.: WO2020/235710
PCT Pub. Date: Nov. 26, 2020

(65) Prior Publication Data
US 2021/0357669 A1 Nov. 18, 2021

(51) Int. Cl.
*G06V 20/59* (2022.01)
*B60K 35/00* (2006.01)
(Continued)

(52) U.S. Cl.
CPC ............. *G06V 20/59* (2022.01); *B60K 35/00* (2013.01); *B60N 2/002* (2013.01); *G06V 40/20* (2022.01);
(Continued)

(58) Field of Classification Search
None
See application file for complete search history.

(56) References Cited

U.S. PATENT DOCUMENTS

| 9,707,913 B1* | 7/2017 | Ochiai | B60W 40/08 |
| 10,528,132 B1* | 1/2020 | Hassani | G02B 27/0093 |

(Continued)

FOREIGN PATENT DOCUMENTS

| JP | 2003137005 | 5/2003 |
| JP | 2018039444 | 3/2018 |

(Continued)

OTHER PUBLICATIONS

International Search Report in International Appln. No. PCT/KR2019/006085, dated Feb. 20, 2020, 5 pages (with English translation).

(Continued)

*Primary Examiner* — Christopher R Lamb
(74) *Attorney, Agent, or Firm* — Fish & Richardson P.C.

(57) ABSTRACT

A method for controlling an autonomous vehicle is disclosed. The vehicle control method, which adjusts a seat installed in a vehicle, a first display positioned in front of the seat and facing the seat, and a second display positioned in front of the first display and facing the seat, includes: detecting the face of a passenger sitting in the seat by a camera installed in the vehicle; estimating the face height from the floor surface of the vehicle; if the estimated face height is lower than a predetermined level, setting a display region on the first display, and, if the estimated face height is higher than the predetermined level, setting the display region on at least part of the second display; and displaying images in the set display region. One or more among an autonomous vehicle, user terminal, and server according to the present invention may be associated with an artificial intelligence module, a robot, an augmented reality (AR) device, a virtual reality (VR) device, etc.

16 Claims, 21 Drawing Sheets

(51) Int. Cl.
  *B60N 2/00* (2006.01)
  *G06V 40/20* (2022.01)
  *B60N 2/20* (2006.01)
(52) U.S. Cl.
  CPC .... *B60K 2370/21* (2019.05); *B60K 2370/349* (2019.05); *B60K 2370/67* (2019.05); *B60K 2370/741* (2019.05); *B60K 2370/77* (2019.05); *B60N 2/20* (2013.01)

(56) References Cited

U.S. PATENT DOCUMENTS

| | | | | |
|---|---|---|---|---|
| 2009/0002268 | A1* | 1/2009 | Ueta | B60K 35/00 348/E13.059 |
| 2009/0128317 | A1* | 5/2009 | Hideshiro | B60K 35/00 340/459 |
| 2016/0359980 | A1 | 12/2016 | Penilla et al. | |
| 2017/0113573 | A1* | 4/2017 | Fujii | B60N 2/72 |
| 2017/0124987 | A1* | 5/2017 | Kim | G06V 20/593 |
| 2017/0364148 | A1* | 12/2017 | Kim | G06F 3/1454 |
| 2018/0032300 | A1* | 2/2018 | Singh | B60K 35/00 |
| 2019/0232786 | A1* | 8/2019 | Sasaki | G06F 3/013 |
| 2019/0299784 | A1* | 10/2019 | Nakano | B60W 50/14 |

FOREIGN PATENT DOCUMENTS

| | | |
|---|---|---|
| JP | 2018106052 | 7/2018 |
| JP | 2018184024 | 11/2018 |
| JP | 2019031138 | 2/2019 |
| KR | 20140101401 | 8/2014 |
| KR | 20160120101 | 10/2016 |
| KR | 20160127492 | 11/2016 |

OTHER PUBLICATIONS

Korean Notice of Allowance in Korean Appln. No. 10-2019-7019222, dated Aug. 21, 2020, 6 pages (with English translation).

* cited by examiner

[Figure 1]
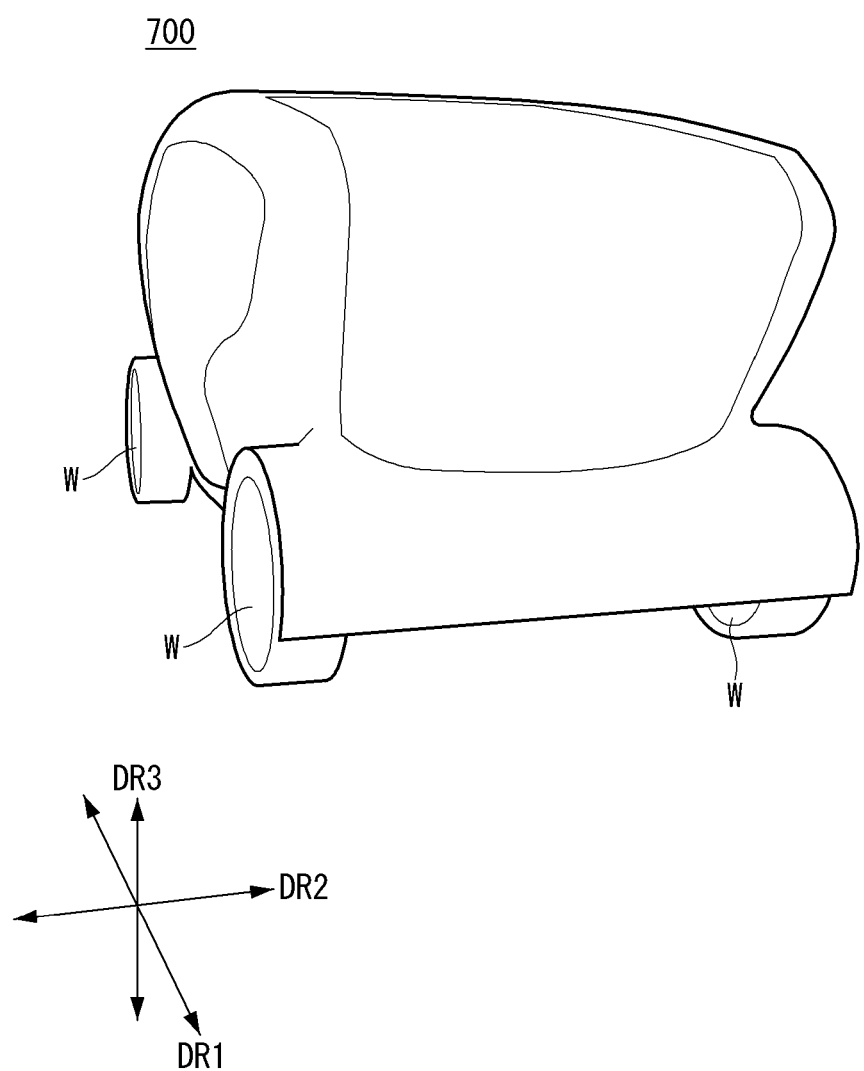

[Figure 2]
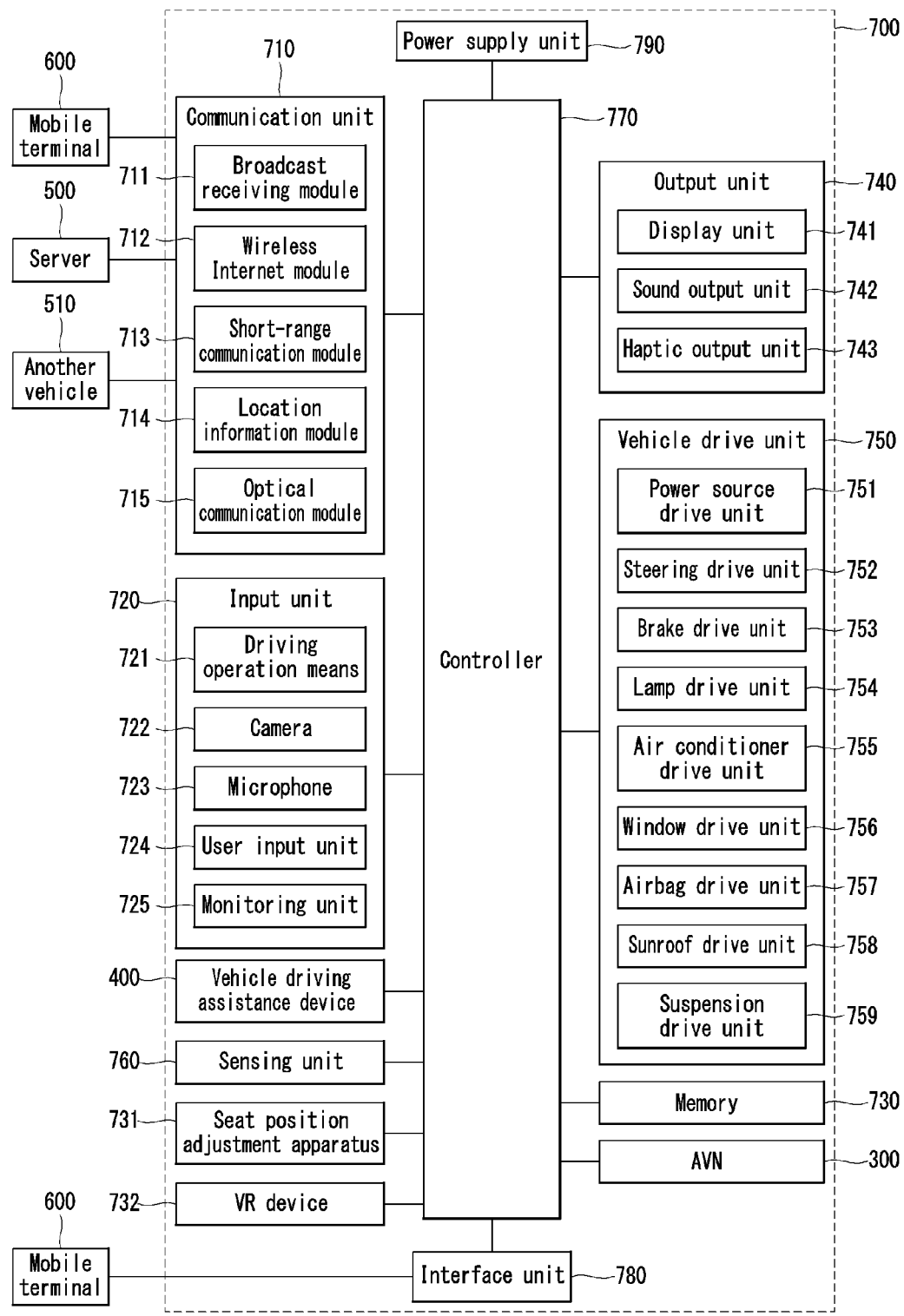

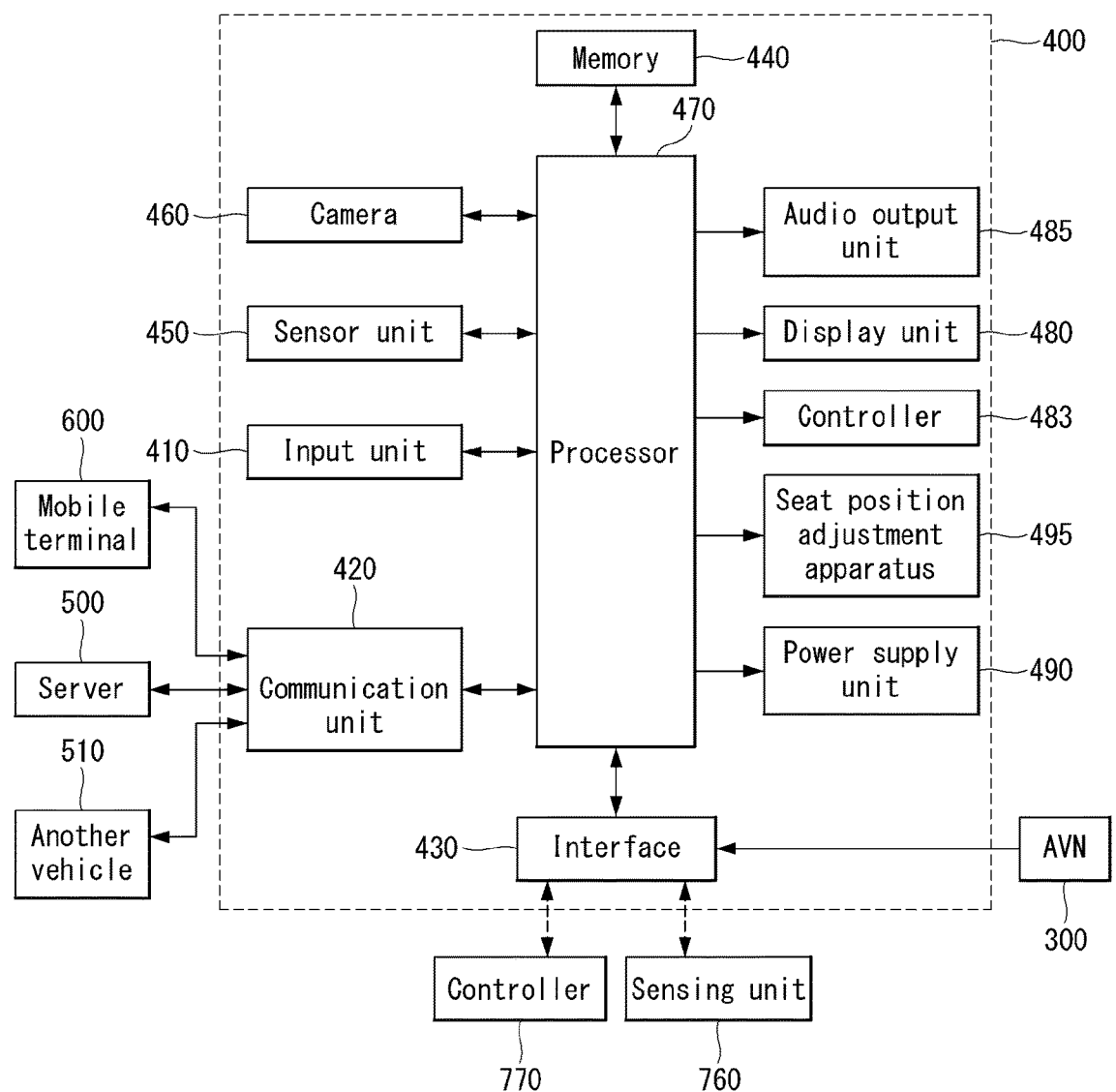
[Figure 3]

[Figure 4]
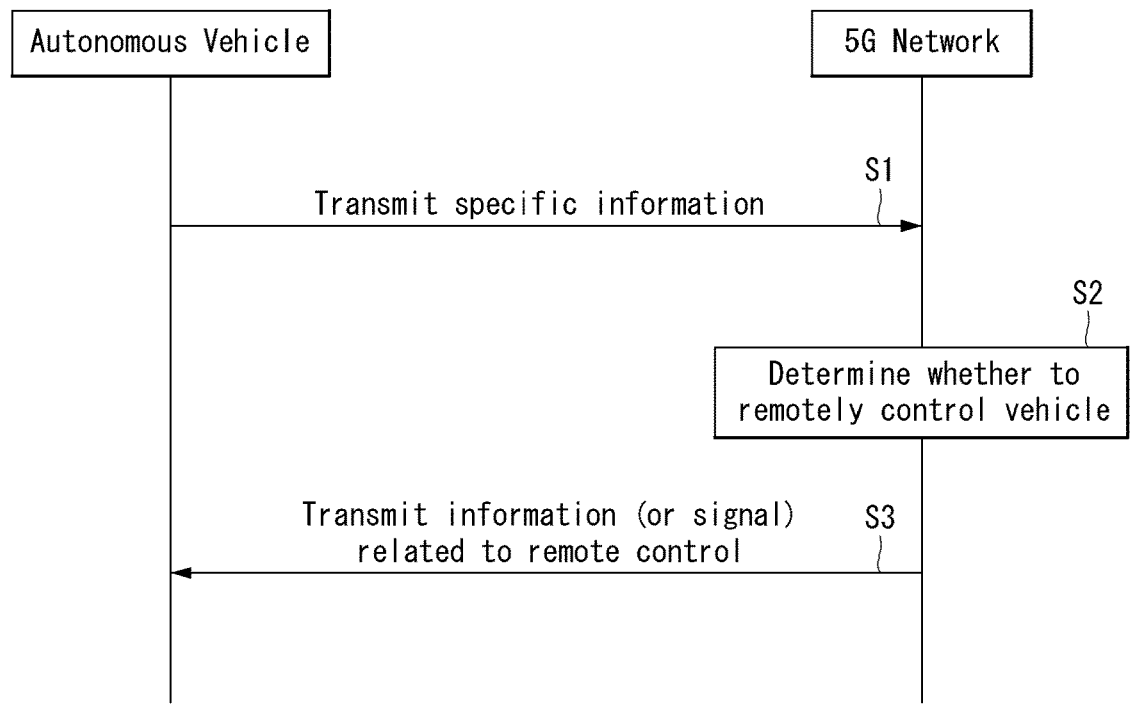

[Figure 5]
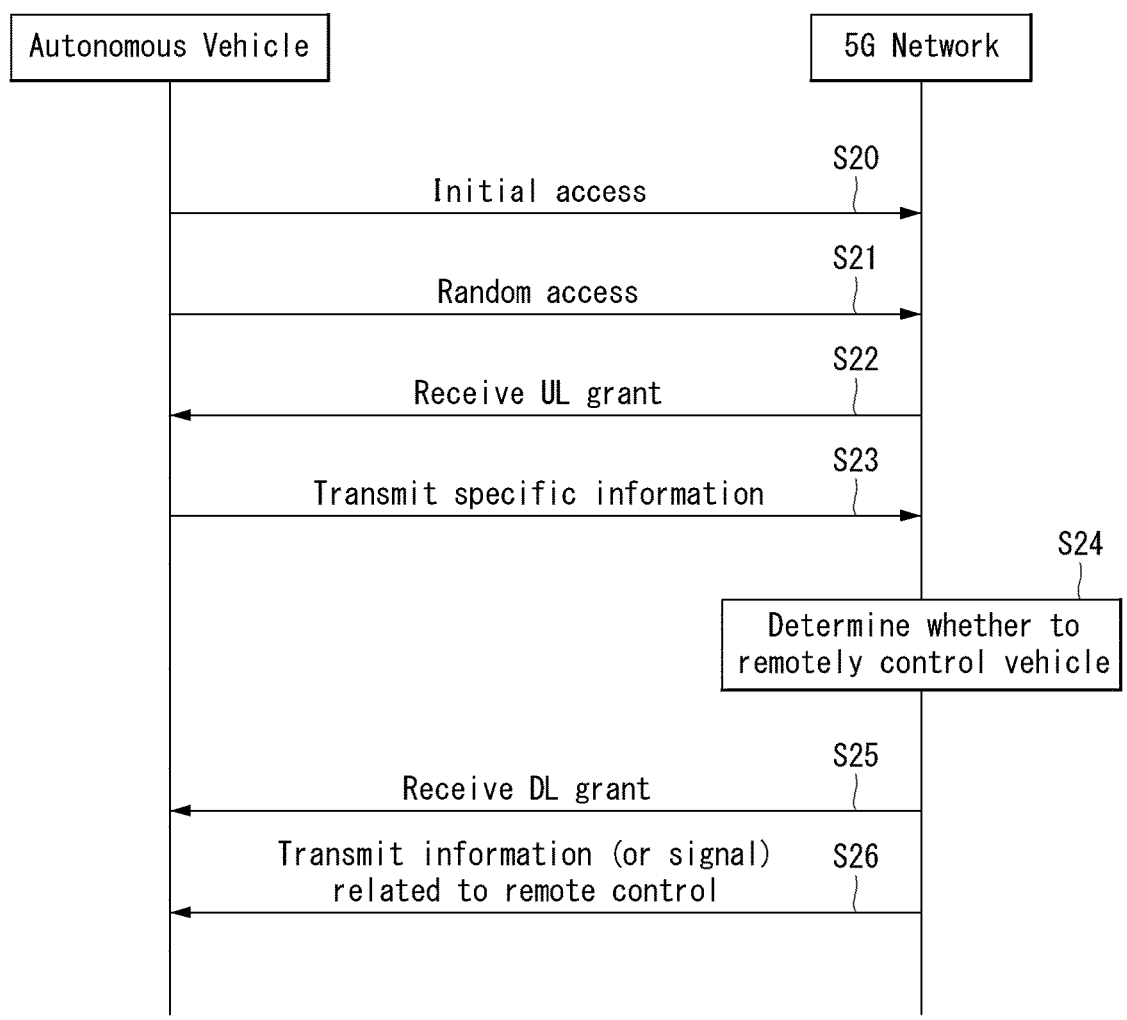

[Figure 6]
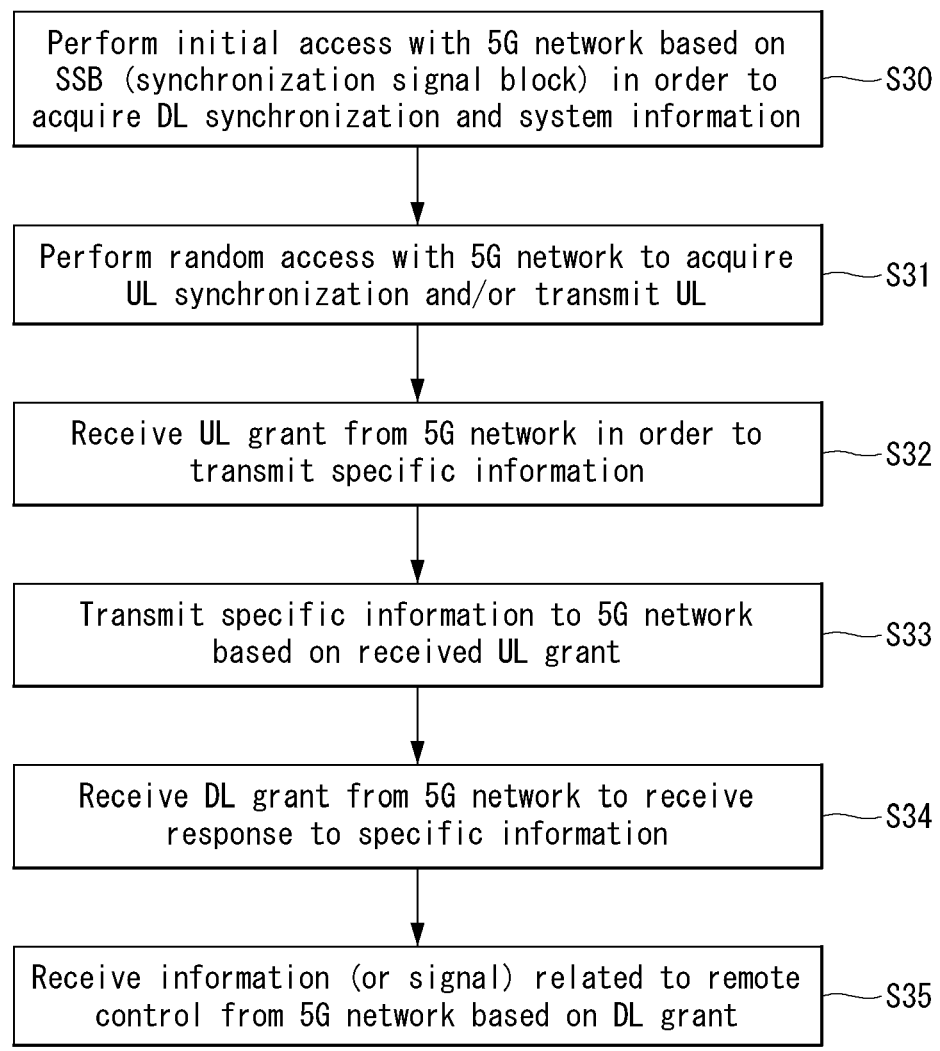

[Figure 7]
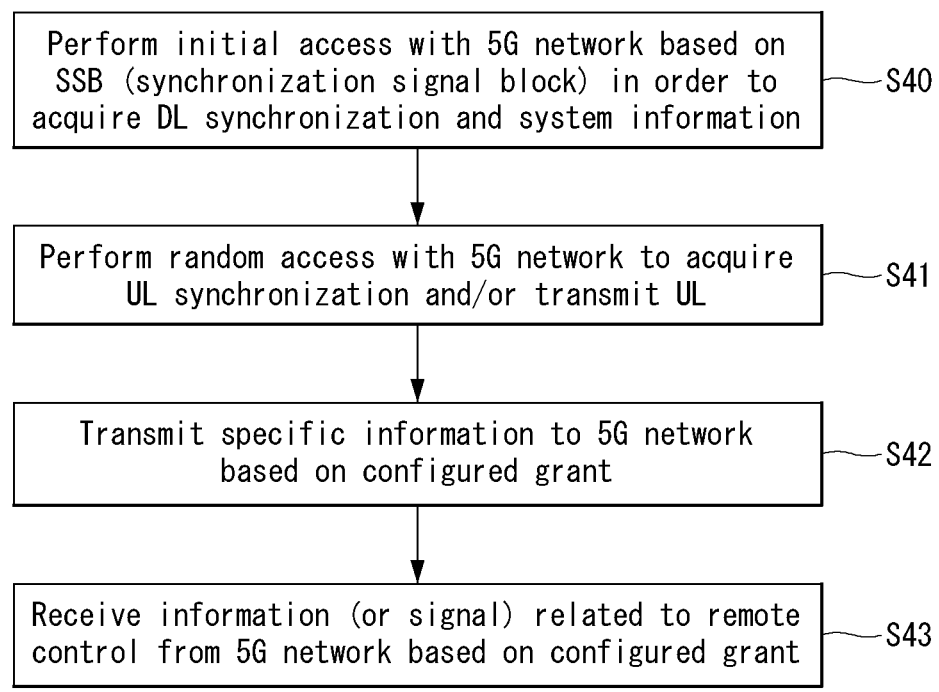

[Figure 8]
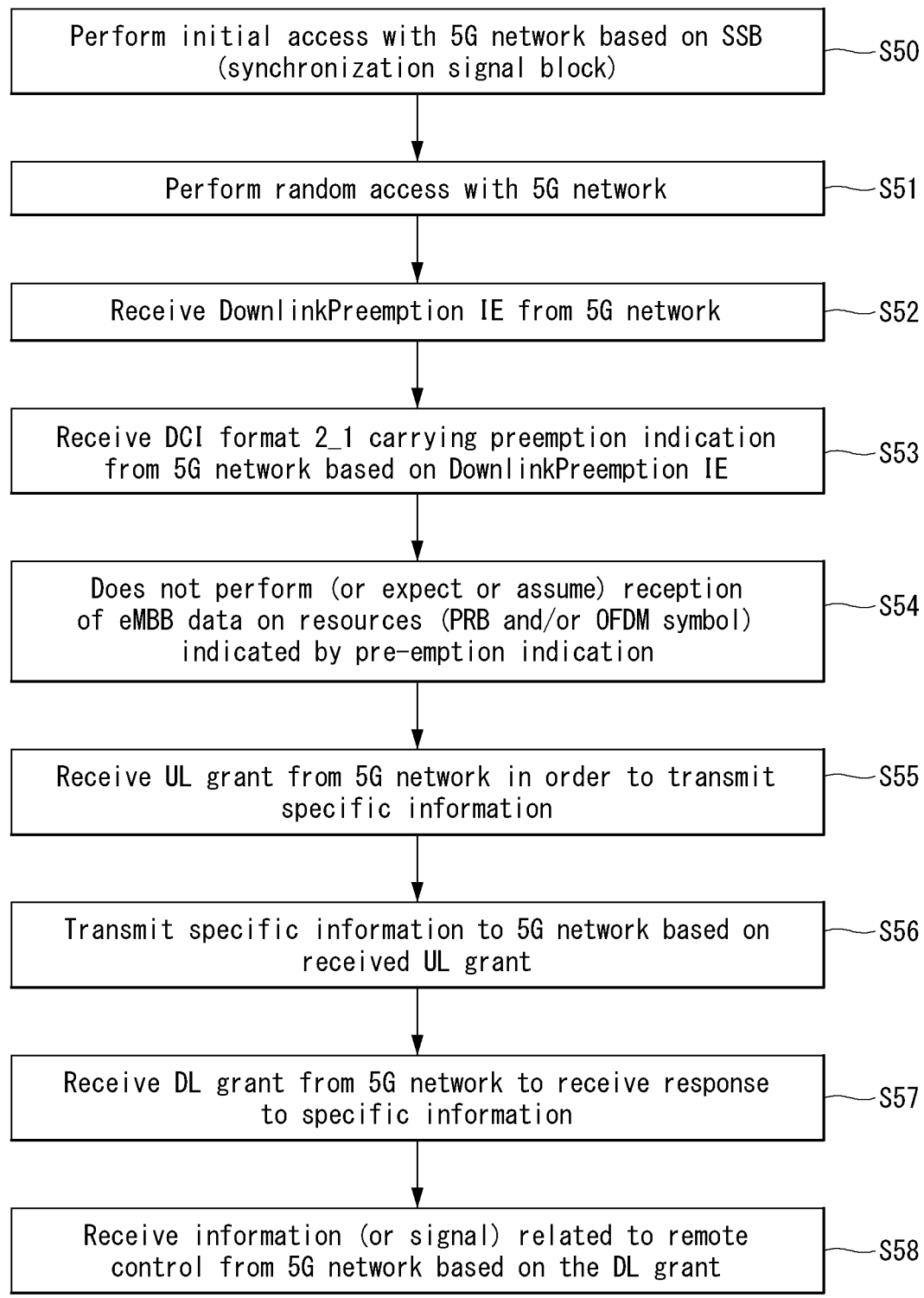

[Figure 9]
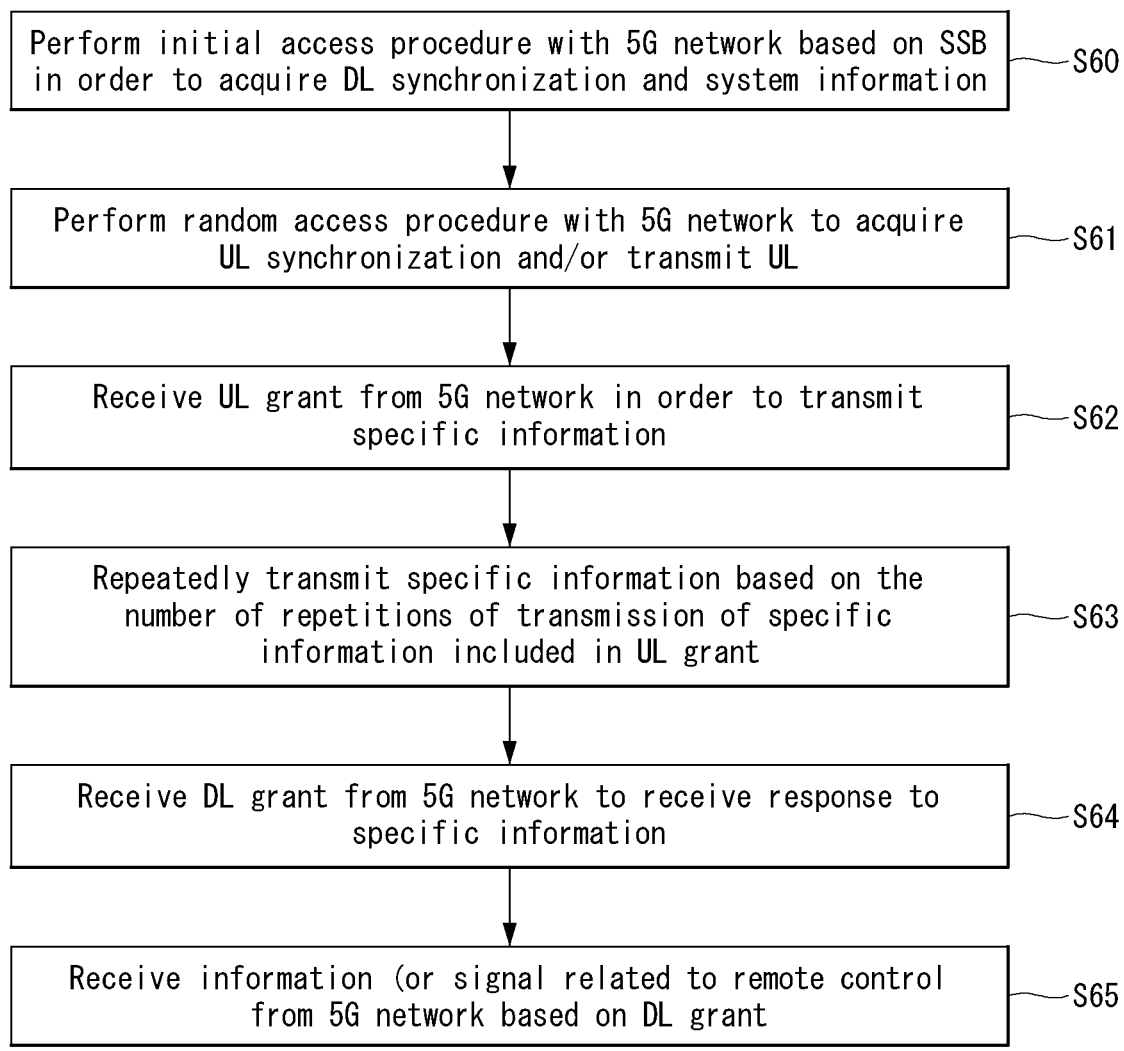

[Figure 10]
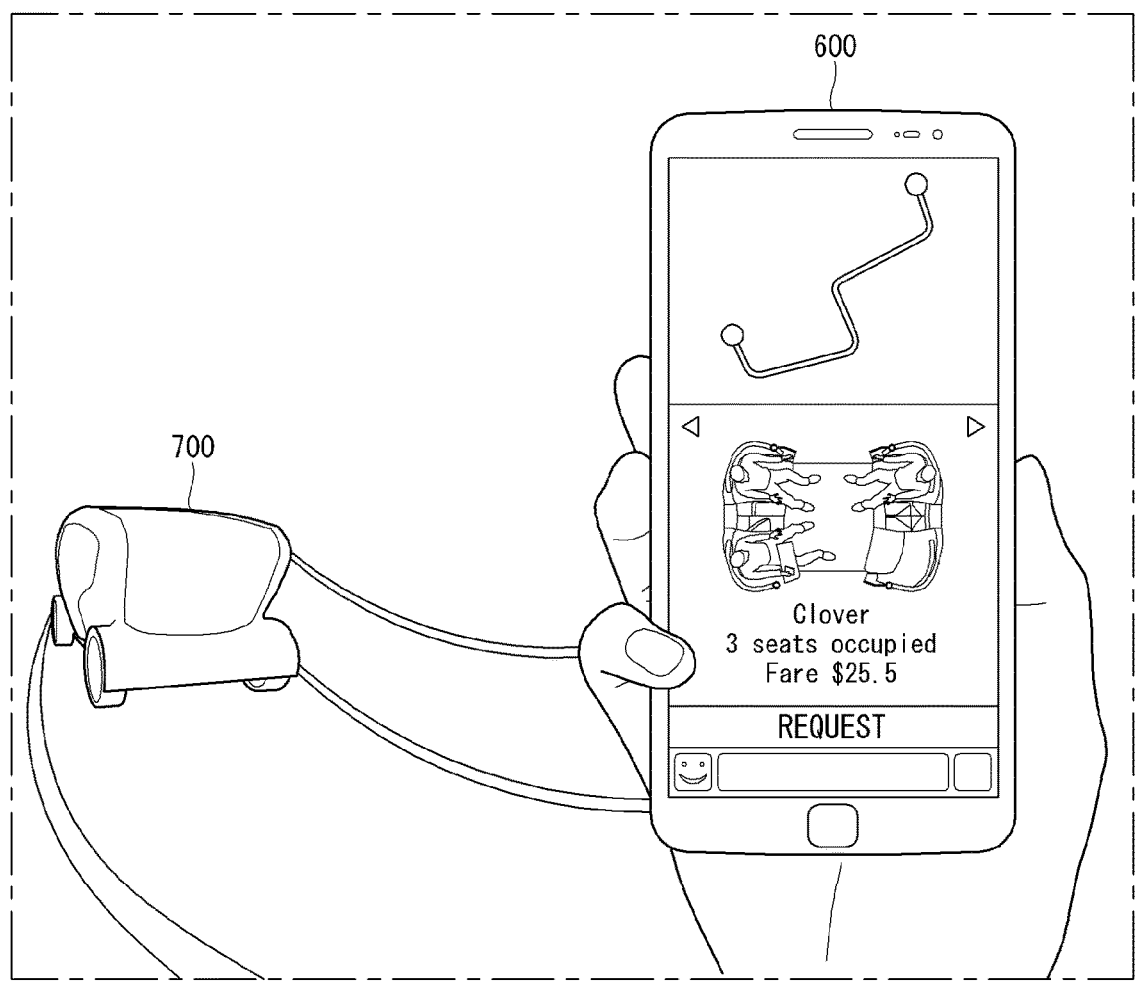

[Figure 11]
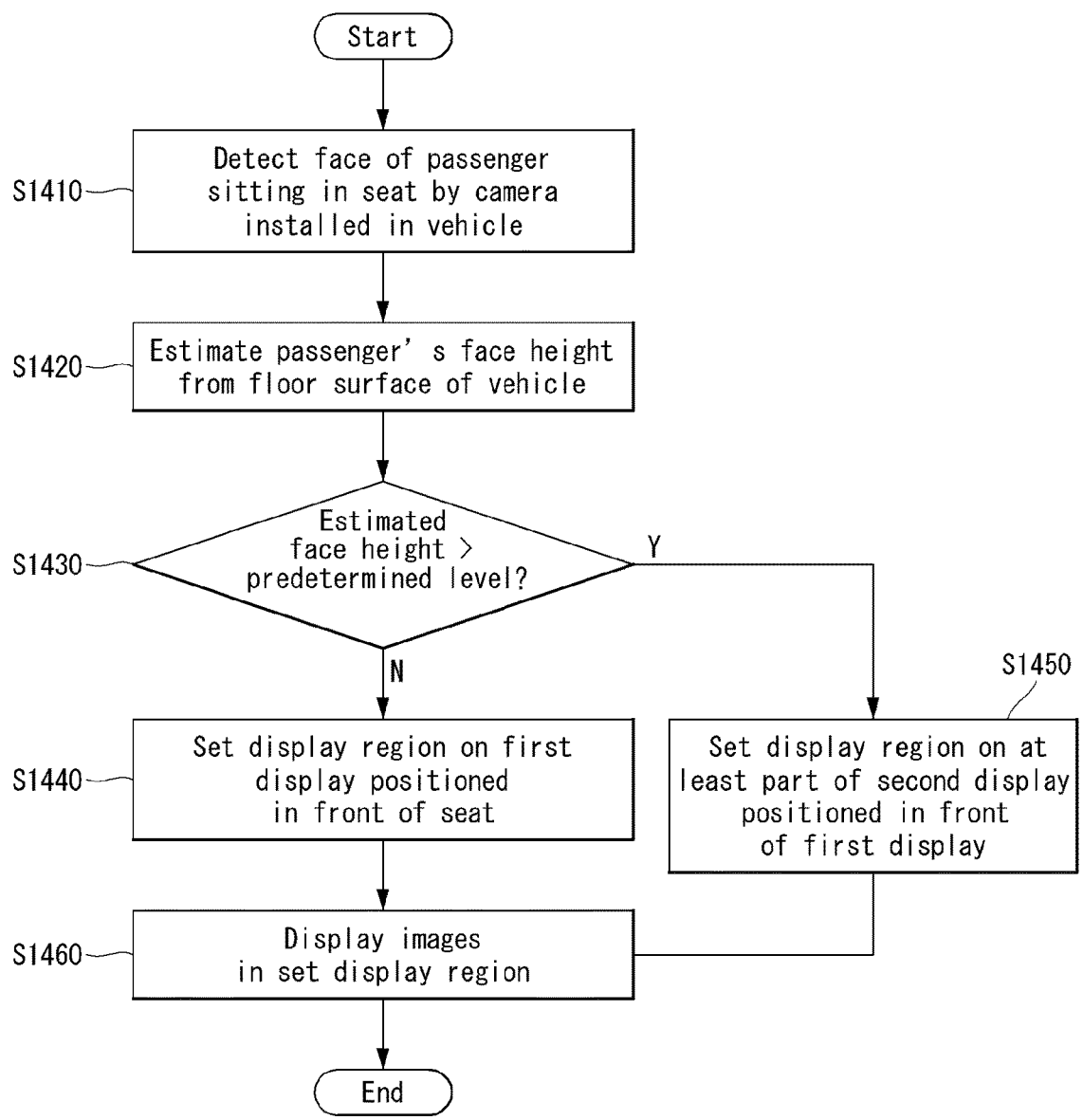

[Figure 12]
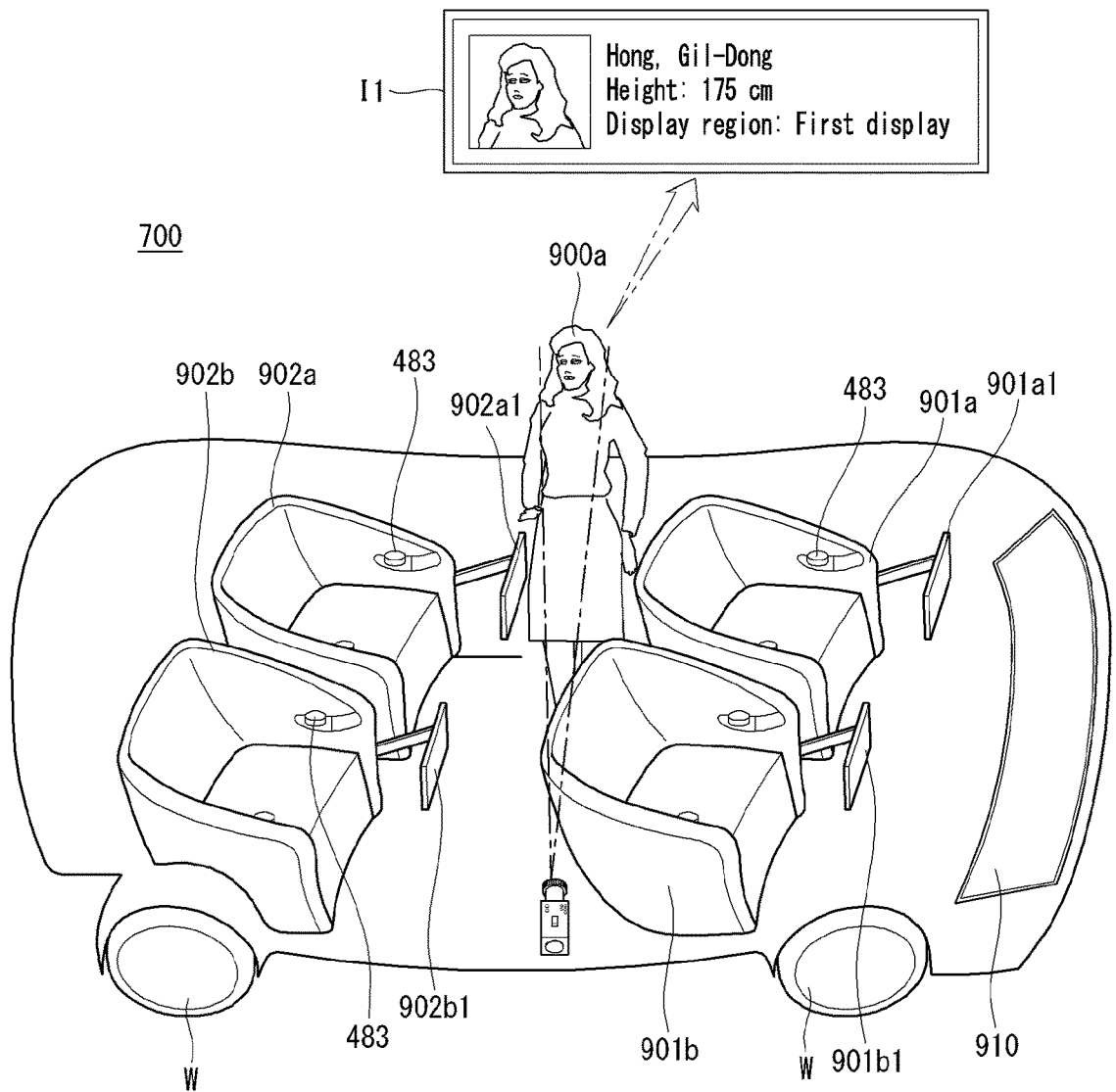

[Figure 13]
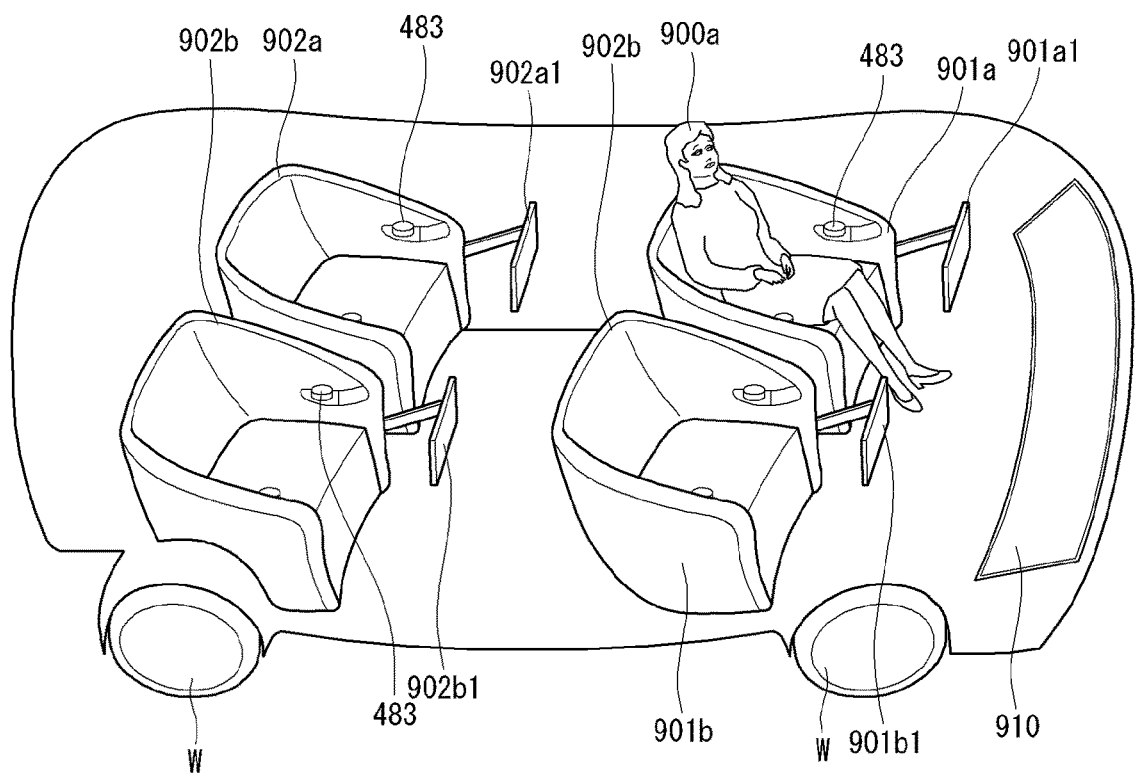

[Figure 14]
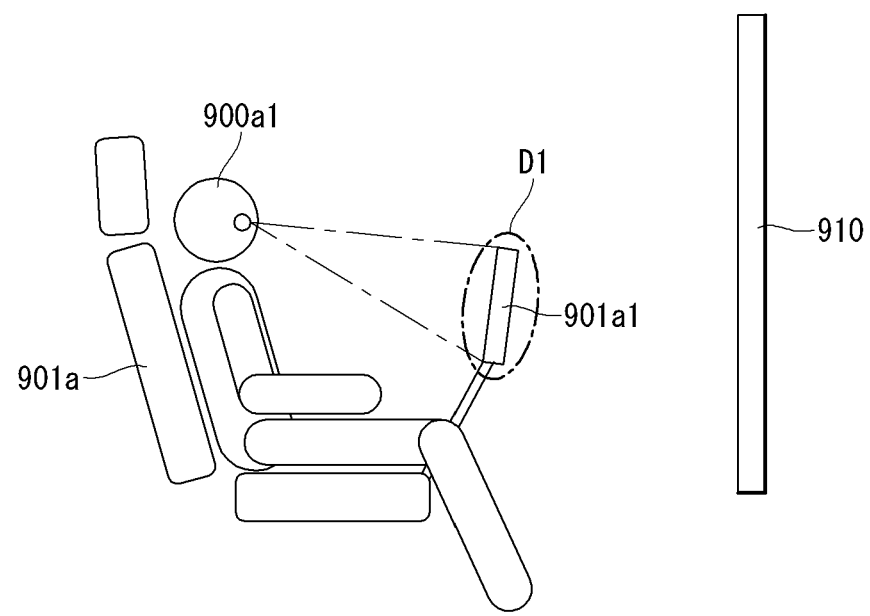
(a)
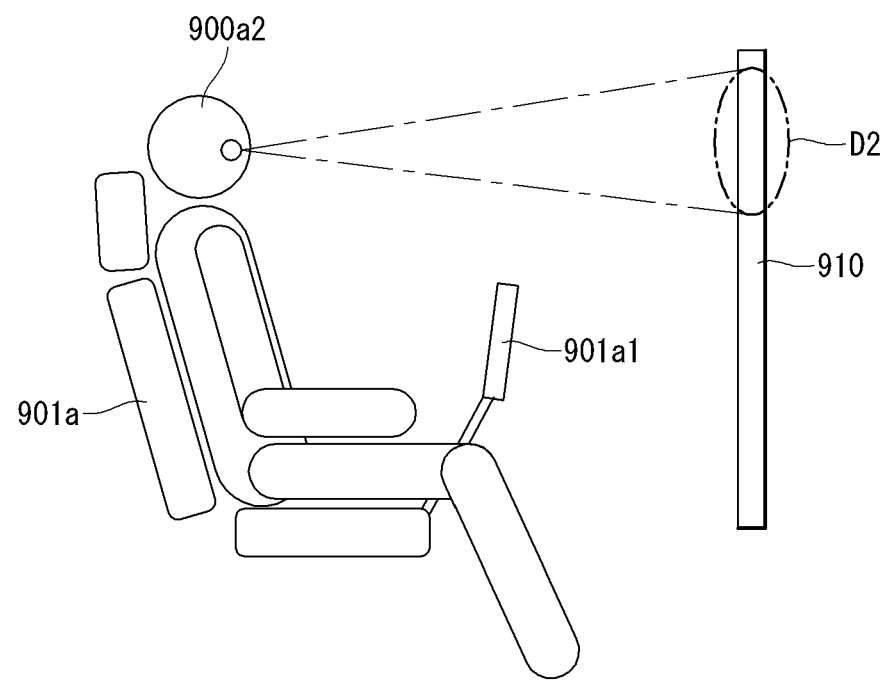
(b)

[Figure 15]
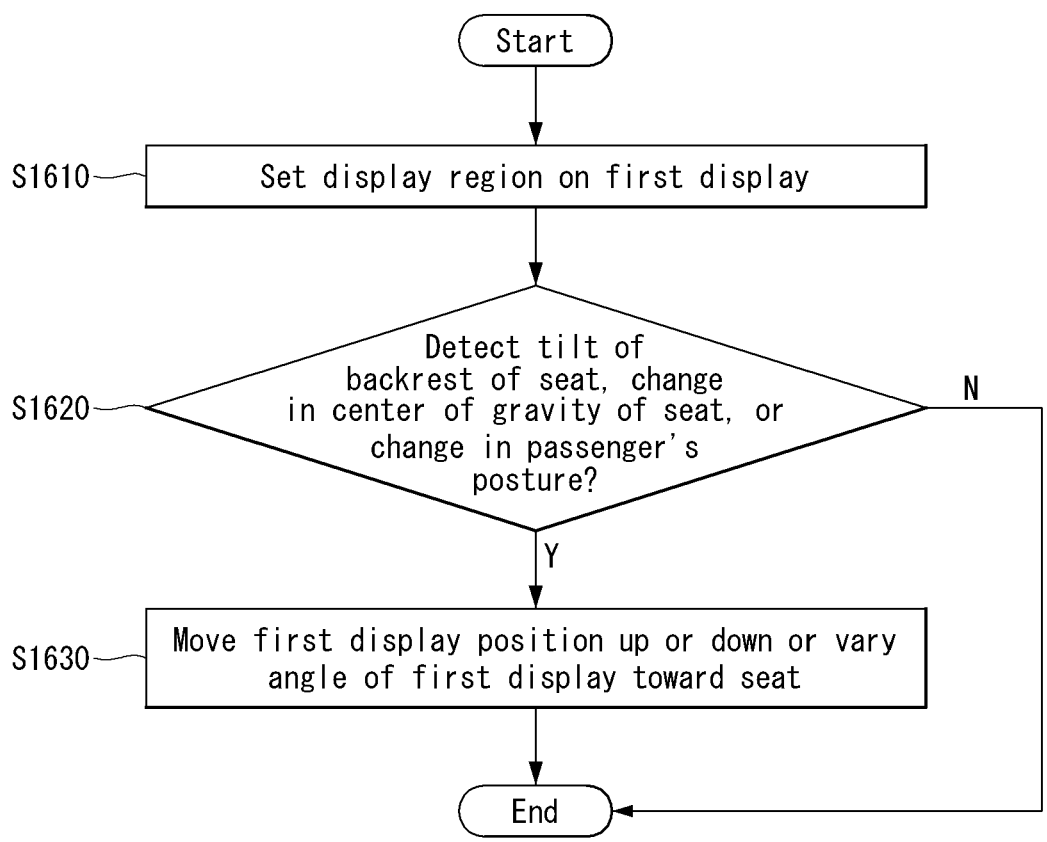

[Figure 16]
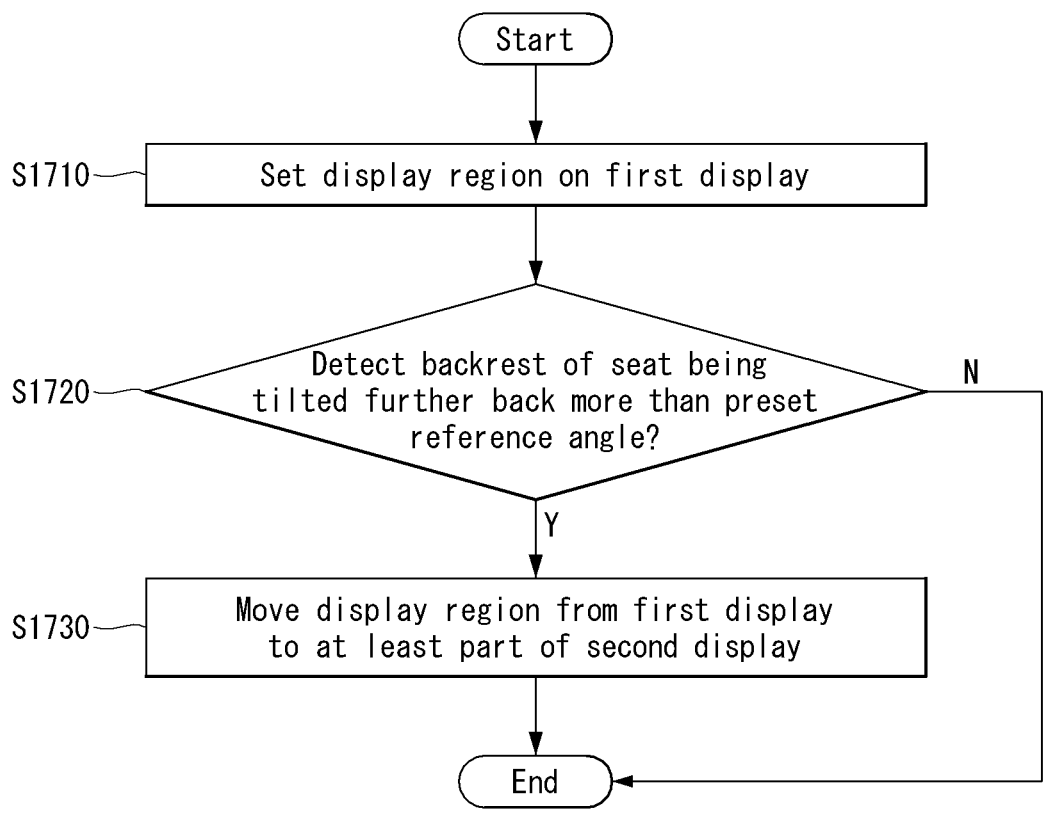

【Figure 17】
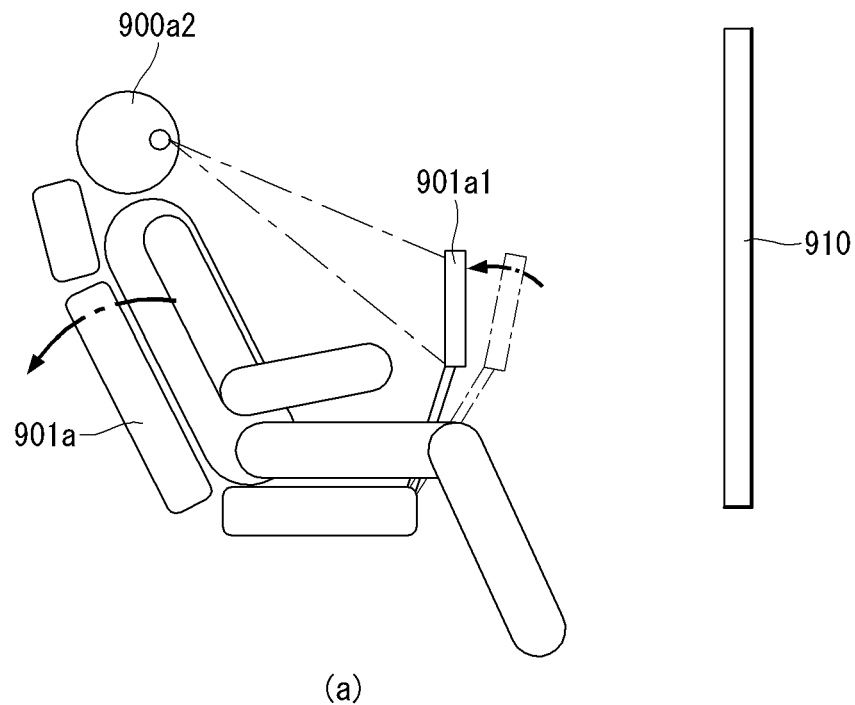
(a)
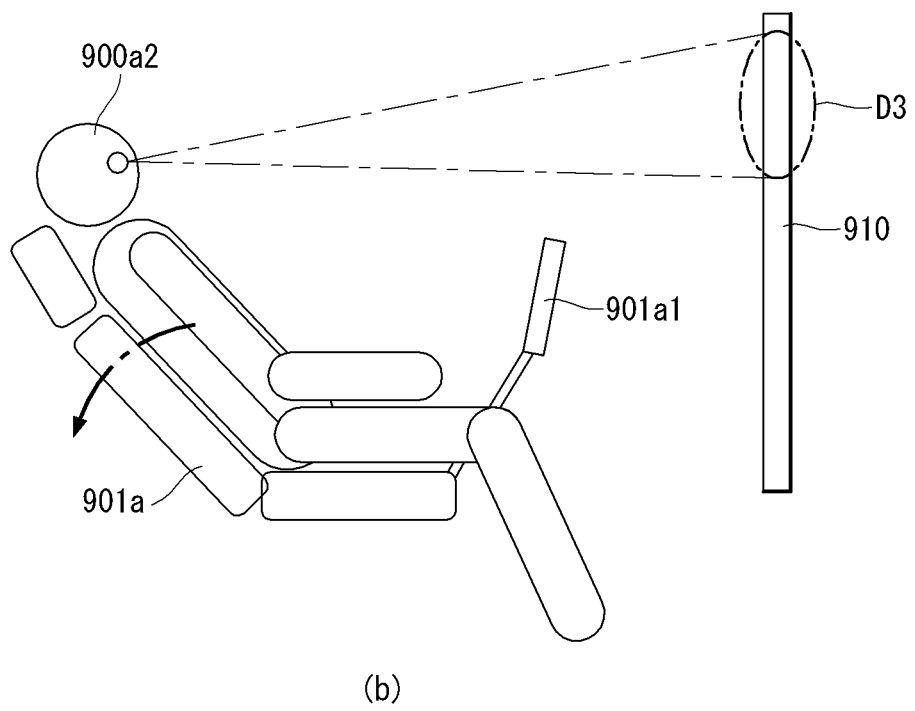
(b)

[Figure 18]
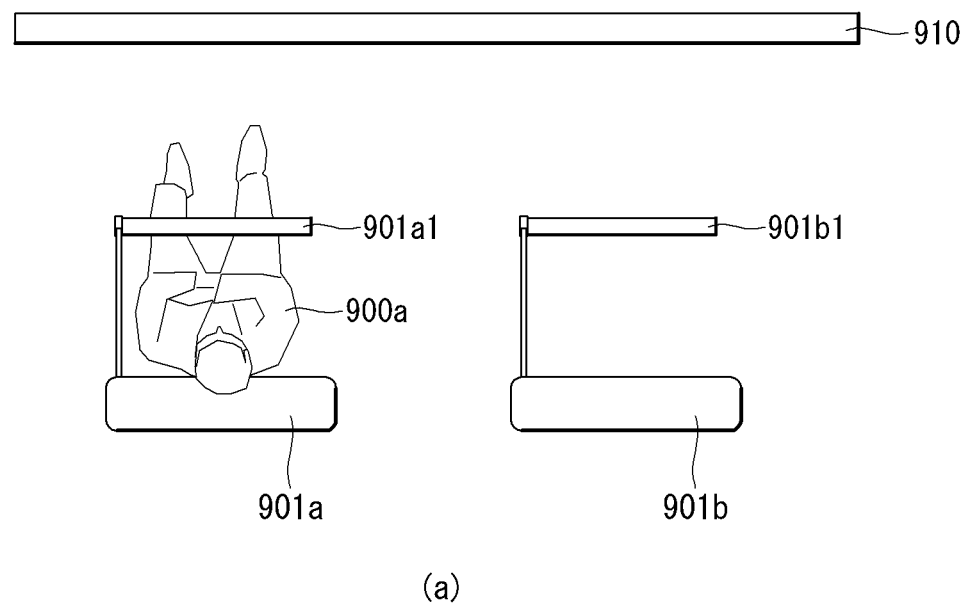
(a)
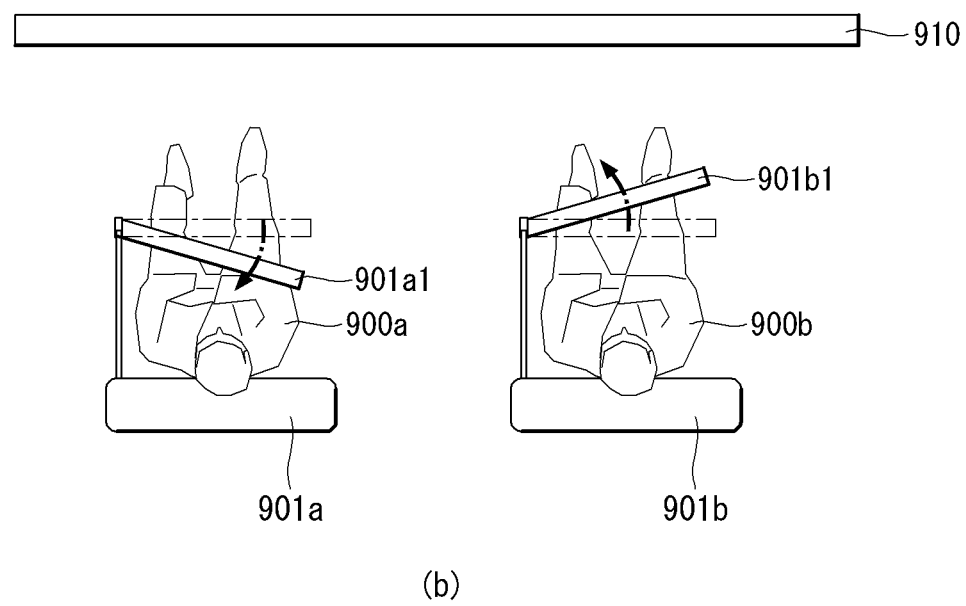
(b)

[Figure 19]
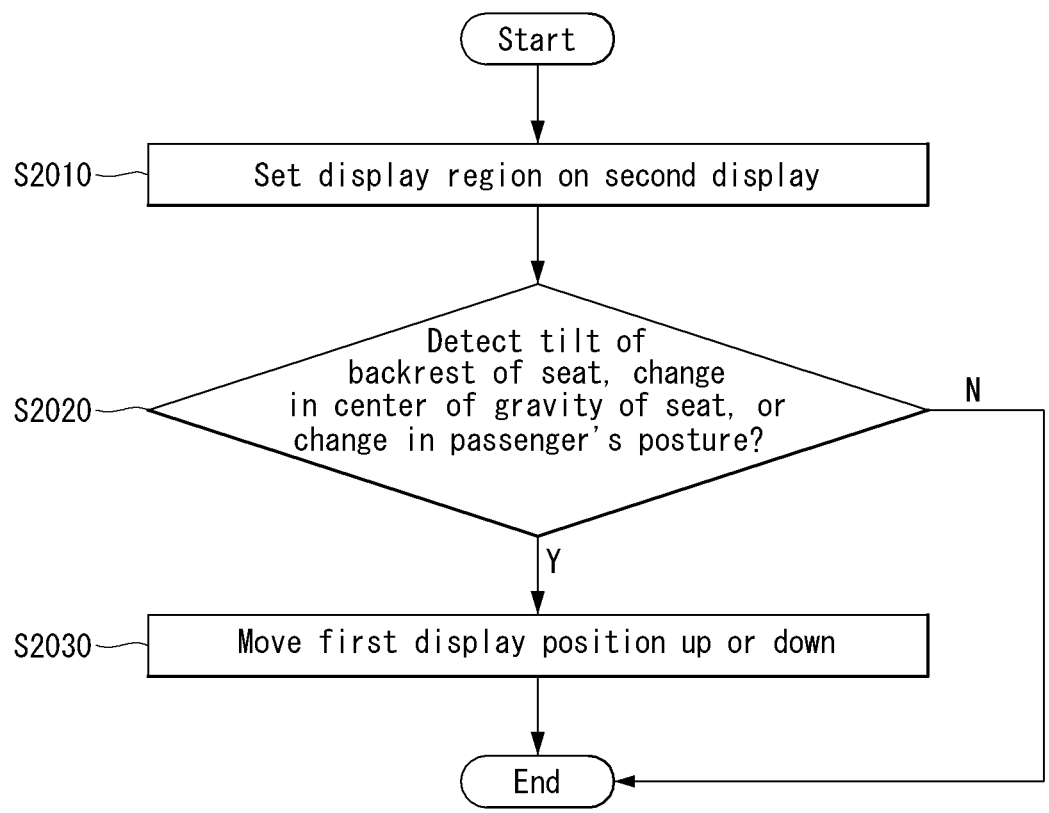

【Figure 20】
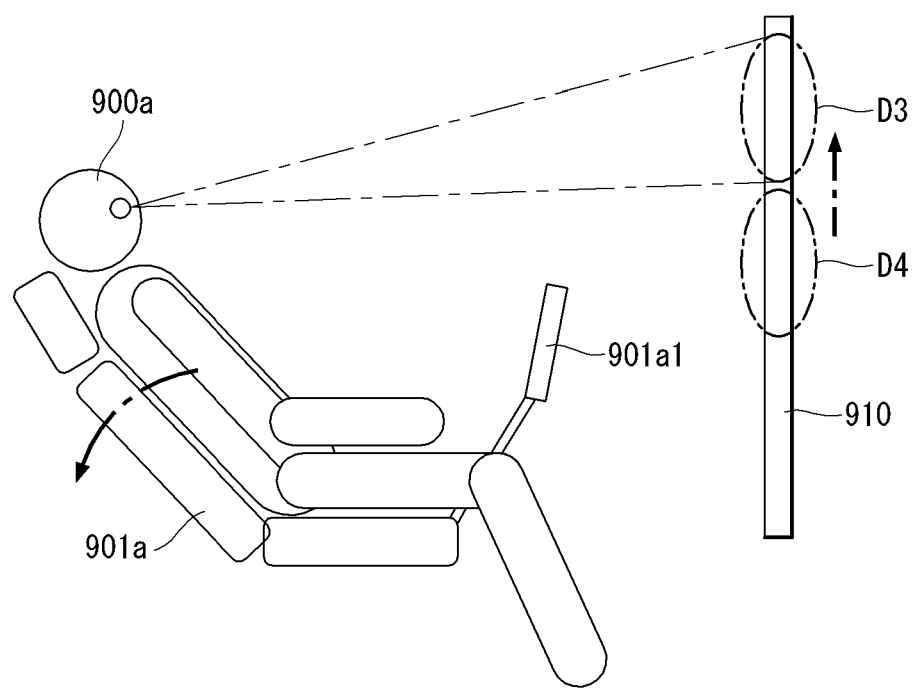

【Figure 21】
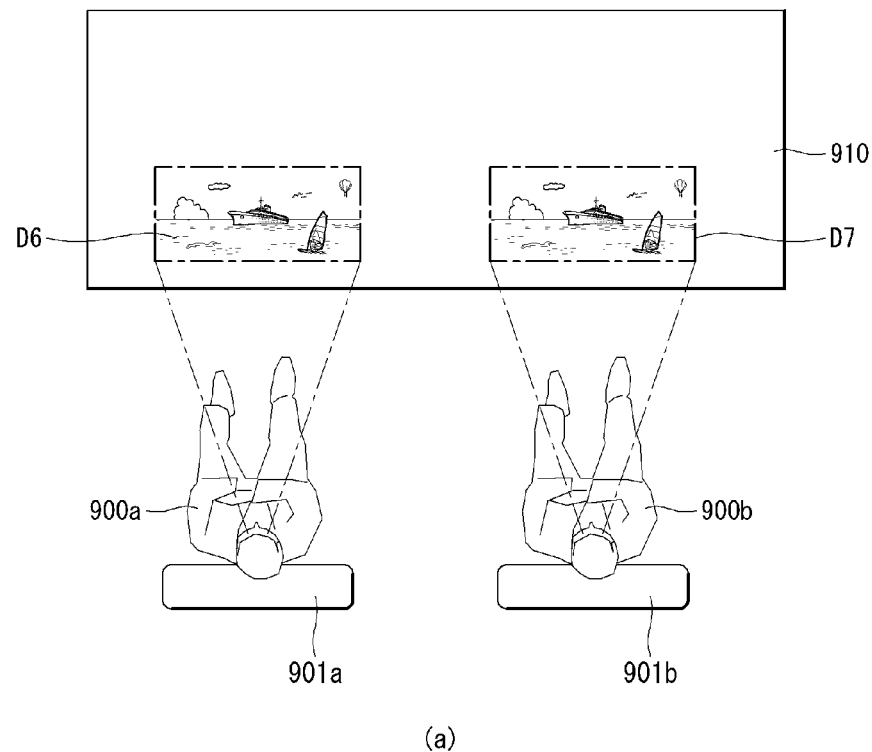
(a)
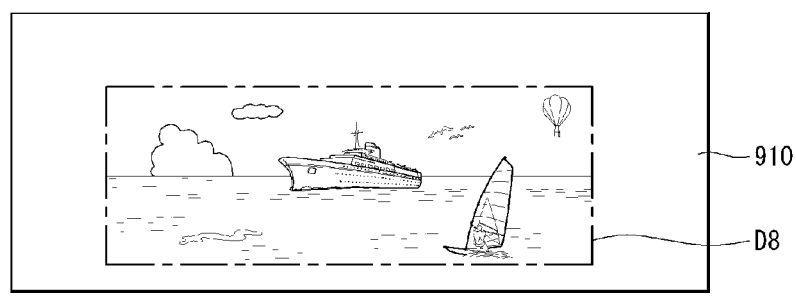
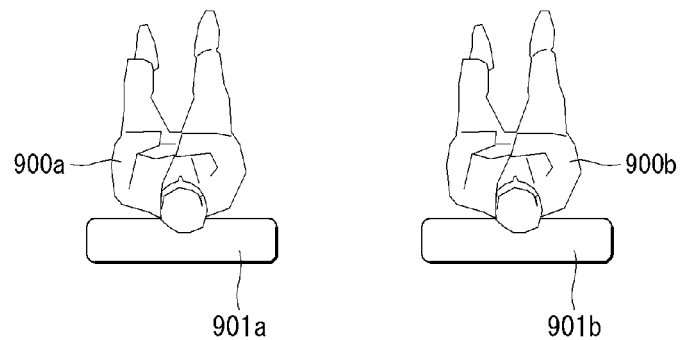
(b)

METHOD FOR CONTROLLING AUTONOMOUS VEHICLE

CROSS-REFERENCE TO RELATED APPLICATIONS

This Application is the National Stage filing under 35 U.S.C. 371 of International Application No. PCT/KR2019/006085, filed on May 21, 2019, the contents of which are incorporated by reference.

TECHNICAL FIELD

The present invention relates to a method for controlling an autonomous vehicle.

BACKGROUND ART

A vehicle may be classified as an internal combustion engine vehicle, an external combustion engine vehicle, a gas turbine vehicle, or an electric vehicle depending on the type of motor used.

In recent years, smart vehicles have been actively developed for the safety or convenience of drivers, pedestrians, etc., and active research is ongoing on sensors mounted on smart vehicles. Cameras, infrared sensors, radar, GPS, Lidar, gyroscopes, etc. are being used in smart vehicles, among which cameras serve to substitute for human eyesDue to the development of various types of sensors and electronic equipment, vehicles with functions for providing display service to passengers while driving are attracting attention.

One of the issues with such vehicles is to provide display service according to a passenger' physical features.

DISCLOSURE

Technical Problem

An aspect of the present invention is to provide a method for controlling a vehicle.

Another aspect of the present invention is to provide a method for setting a display region of a display based on a passenger's physical features.

Another aspect of the present invention is to provide a method for changing a display region of a display according to changes in a passenger's state.

Another aspect of the present invention is to provide a method for setting a display region of a display when there are multiple passengers.

Technical Solution

An exemplary embodiment of the present invention provides vehicle control method, which adjusts a seat installed in a vehicle, a first display positioned in front of the seat and facing the seat, and a second display positioned in front of the first display and facing the seat, the vehicle control method including: detecting the face of a passenger sitting in the seat by a camera installed in the vehicle; estimating the face height from the floor surface of the vehicle; if the estimated face height is lower than a predetermined level, setting a display region on the first display, and, if the estimated face height is higher than the predetermined level, setting a display region on at least part of the second display; and displaying images in the set display region.

The vehicle control method may further include, upon detecting a tilt of the backrest of the seat after the display region is set on the first display, moving the position of the first display up or down.

The vehicle control method may further include, upon detecting a tilt of the backrest of the seat after the display region is set on the first display, varying the angle of the first display toward the seat.

The vehicle control method may further include, upon detecting the backrest of the seat being tilted back more than a preset reference angle, after the display region is set on the first display, setting a new display region on at least part of the second display.

The vehicle control method may further include, upon detecting a change in the passenger's direction of gaze by the camera, after the display region is set on the first display, changing the position of the first display based on the change in the passenger's direction of gaze.

The vehicle control method may further include, upon detecting a change in the passenger's posture by the camera, after the display region is set on the first display, changing the position of the first display based on the change in posture.

The vehicle control method may further include, upon detecting a change in the center of gravity of the seat by a weight sensor installed on the seat, after the display region is set on the first display, changing the position of the first display based on the change in center of gravity.

The vehicle control method may further include, upon detecting a tilt of the backrest of the seat after the display region is set on the second display, moving the display region up or down.

The vehicle control method may further include, upon detecting a change in the center of gravity of the seat by a weight sensor installed on the seat, after the display region is set on the second display, changing the position of the first display based on the change in center of gravity.

The vehicle control method may further include: detecting the brightness outside the vehicle; and adjusting the brightness of the display region based on the detected brightness.

The vehicle control method may further include: detecting the brightness outside the vehicle; and, if the display region is set on the second display, adjusting the light transmittance of the second display based on the detected brightness.

The vehicle control method may further include: if the passenger is a first passenger and the seat is a first seat, detecting a second passenger sitting in a seat positioned to one side of the first seat by the camera; and, if the display region is set on the first display, rotating or pivoting the first display toward the first seat after detecting the second passenger.

The vehicle control method may further include: if the passenger is a first passenger and the seat is a first seat, detecting a second passenger sitting in a seat positioned to one side of the first seat by the camera; and, if the display region is set on the first display, activating a film that covers the first display and narrowing the angle of view of the first display after detecting the second passenger.

The vehicle control method may further include: if the passenger is a first passenger, the display region is a first display region, and the seat is a first seat, detecting a second passenger sitting in a seat positioned to one side of the first seat by the camera; and, if the first display region is set on at least part of the second display, setting a second display region for the second passenger in an area extending from the first display region.

The vehicle control method may further include, upon receiving an input for setting a display region, setting the display region according to the input.

The vehicle control method may further include, if the detected face of the passenger is stored face information and there is display region information corresponding the stored face information, setting the display region according to the display region information.

Advantageous Effects

A vehicle control device according to the present invention has the following advantages.

According to at least one exemplary embodiment of the present invention, it is possible to provide a method for setting a display region of a display based on a passenger's physical features.

According to at least one exemplary embodiment of the present invention, it is possible to provide a method for changing a display region of a display according to changes in a passenger's state.

According to at least one exemplary embodiment of the present invention, it is possible to provide a method for setting a display region on a display when there are multiple passengers.

DESCRIPTION OF DRAWINGS

FIG. 1 shows an appearance of a vehicle equipped with a vehicle control apparatus according to an embodiment of the present invention.

FIG. 2 is an internal block diagram illustrating one example of the vehicle.

FIG. 3 is an internal block diagram illustrating one example of the vehicle control device according to an exemplary embodiment of the present invention.

FIG. 4 shows an example of basic operations of an autonomous vehicle and 5G network in a 5G communication system.

FIG. 5 shows an example of application operations of an autonomous vehicle and 5G network in a 5G communication system.

FIGS. 6 to 9 show an example of an autonomous vehicle operation using 5G communication.

FIG. 10 shows an example of an autonomous vehicle according to the present invention.

FIGS. 11 to 14 are views showing an exemplary embodiment in which a display region is personalized based on physical features of a passenger in a vehicle.

FIGS. 15 to 17 are views of an exemplary embodiment showing how a display region is changed according to changes in a passenger's state.

FIG. 18 is a view showing how a display region is changed when there are multiple passengers.

FIGS. 19 and 20 are views of an exemplary embodiment showing how a display region is changed according to changes in a passenger's state.

FIG. 21 is a view showing how a display region is changed according to changes in a passenger's state.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle as described in this specification may include a car and a motorcycle. Hereinafter, a car will be as an example of a vehicle.

A vehicle as described in this specification may include all of an internal combustion engine vehicle including an engine as a power source, a hybrid vehicle including both an engine and an electric motor as a power source, and an electric vehicle including an electric motor as a power source.

In some implementations, the left of a vehicle means the left of the vehicle in the direction of travel and the right of the vehicle means the right of the vehicle in the direction of travel.

In some implementations, a left hand drive (LHD) vehicle will be assumed unless otherwise stated.

Hereinafter, a user, a driver, a passenger, and a fellow passenger may be used interchangeably depending on the embodiment.

In the following description, the vehicle control device 400 is a separate device provided in the vehicle 700, and may exchange necessary information with the vehicle 700 through data communication. The vehicle control device 400 may include at least some of the units of the vehicle 700. The vehicle control device 400 may be referred to as a control device 400, a driving assistance device 400, a vehicle driving assistance device 400, or an assistance device 400.

Alternatively, at least some of the units of the vehicle control device 400 may be a unit(s) of the vehicle 700 or of another device mounted in the vehicle 700. Such external units may be understood as being included in the vehicle control device 400 by transmitting and receiving data through an interface unit of the vehicle control device 400.

FIG. 1 shows an exterior appearance of a vehicle equipped with a vehicle control device according to an exemplary embodiment of the present invention.

Referring to FIG. 1, a vehicle 700 may include a wheel W rotated by a power source. The first direction DR1 may be referred to as a front-rear direction. The vehicle 700 may be advanced or retracted along the first direction DR1. The second direction DR2 may be perpendicular to the first direction DR1. The second direction DR2 may be referred to as a left and right direction. The third direction DR3 may be perpendicular to the first direction DR1 or the second direction DR2. The third direction DR3 may be referred to as a vertical direction.

FIG. 2 is an internal block diagram illustrating one example of the vehicle 700. The vehicle may include a communication unit 710, an input unit 720, a sensing unit 760, an output unit 740, a vehicle drive unit 750, a memory 730, an interface unit 780, a controller 770, a power source unit 790, a control device 400, and an AVN apparatus 300. The communication unit 710 may include one or more modules to enable the wireless communication between the vehicle and the mobile terminal 600, between the vehicle and an external server 500, or between the vehicle and another vehicle 510. In addition, the communication unit 710 may include one or more modules to connect the vehicle to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 700. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 500 in a wireless manner. The wireless Internet module 712 may receive weather information and road traffic state information (e.g., Transport Protocol Expert Group (TPEG) information) from the external server 500.

The short-range communication module 713 may assist short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 700 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user boards the vehicle 700, the mobile terminal 600 of the user and the vehicle 700 may pair with each other automatically or as the user executes a pairing application.

The location information module 714 is a module to acquire a location of the vehicle 700. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 700. For example, the light emitting unit may be at least one selected from among a headlight, a taillight, a brake light, a turn signal light, and a sidelight. For example, the optical communication module 715 may exchange data with another vehicle 510 via optical communication.

The input unit 720 may include a driving operation unit 721, a camera 722, a microphone 723, and a user input unit 724.

The driving operation unit 721 is configured to receive user input for the driving of the vehicle. The driving operation unit 721 may include a steering input unit 721a, a shift input unit 721b, an acceleration input unit 721c, and a brake input unit 721d.

The camera 722 may include an image sensor and an image processing module. The camera 722 may process a still image or a moving image acquired by the image sensor (e.g., a CMOS or a CCD). The image processing module may extract required information by processing a still image or a moving image acquired via the image sensor and, then, may transmit the extracted information to the controller 770. Meanwhile, the vehicle 700 may include the camera 722 to capture a forward image or a surround-view image of the vehicle and a monitoring unit 725 to capture an image of the interior of the vehicle.

The monitoring unit 725 may capture an image of a passenger. The monitoring unit 725 may capture an image of biometrics of the passenger.

The microphone 723 may process external sound signals into electrical data. The processed data may be utilized in various ways according to a function that the vehicle 700 is performing. The microphone 723 may convert a user voice command into electrical data. The converted electrical data may be transmitted to the controller 770.

Meanwhile, in some embodiments, the camera 722 or the microphone 723 may be components of the sensing unit 760, other than components of the input unit 720.

The user input unit 724 is configured to receive information from the user. When information is input via the user input unit 724, the controller 770 may control the operation of the vehicle 700 to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, the traveling of the vehicle 700. To this end, the sensing unit 760 may include a collision sensor, a wheel sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, an infrared sensor, a radar, and Lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation angle information.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, the monitoring unit 725 and the microphone 723 may operate as sensors. The biometric information sensing unit may acquire hand geometry information and facial recognition information via the monitoring unit 725.

The output unit 740 is configured to output information processed in the controller 770. The output unit 740 may include a display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a liquid crystal display (LCD), a thin film transistor liquid-crystal display (TFT LCD), an organic light-emitting diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display unit 741 may include a touch sensor which senses a touch to the display unit 741 so as to receive a control command in a touch manner.

When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like. Hereinafter, a touch or a touch input may generally refer to various types of touches mentioned above.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control for a power source inside the vehicle 700. For example, in the case where a fossil fuel based engine (not illustrated) is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770. In another example, when an electric motor (not illustrated) is a power source, the power source drive unit 751 may perform control for the motor. As such, the power source drive unit 751 may control, for example, the RPM and torque of the motor.

The steering drive unit 752 may include a steering apparatus. As such, the direction of travel of the vehicle may be changed.

The brake drive unit 753 may perform electronic control of a brake apparatus (not illustrated) inside the vehicle 700. For example, the brake drive unit 753 may reduce the speed of the vehicle 700 by controlling the operation of brakes located at wheels. In another example, the brake drive unit 753 may adjust the direction of travel of the vehicle 700 leftward or rightward by differentiating the operation of respective brakes located at left and right wheels.

The lamp drive unit 754 may turn at least one lamp arranged inside and outside the vehicle 700 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner (not illustrated) inside the vehicle 700. For example, when the interior temperature of the vehicle 700 is high, the air conditioner drive unit 755 may operate the air conditioner to supply cold air to the interior of the vehicle 700.

The window drive unit 756 may perform the electronic control of a window apparatus inside the vehicle 700. For example, the window drive unit 756 may control the opening or closing of left and right windows of the vehicle 700.

The airbag drive unit 757 may perform the electronic control of an airbag apparatus inside the vehicle 700. For example, the airbag drive unit 757 may control an airbag to be deployed in a dangerous situation.

The sunroof drive unit 758 may perform electronic control of a sunroof apparatus inside the vehicle 700. For example, the sunroof drive unit 758 may control the opening or closing of a sunroof.

The suspension drive unit 759 may perform electronic control on a suspension apparatus (not shown) inside the vehicle 700. For example, when the road surface is uneven, the suspension drive unit 759 may control the suspension apparatus to reduce vibration of the vehicle 700.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 700 such as, for example programs for the processing or control of the controller 770.

The interface unit 780 may serve as a passage for various kinds of external devices that are connected to the vehicle 700. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 700. The controller 770 may be referred to as an Electronic Control Unit (ECU).

The controller 770 may execute a function corresponding to an execution signal delivered from the control device 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power source unit 790 may supply power required to operate the respective components under the control of the controller 770. In particular, the power source unit 790 may receive power from, for example, a battery (not illustrated) inside the vehicle 700.

The AVN apparatus 300 may exchange data with the controller 770. The controller 770 may receive navigation information from the AVN apparatus 300 or a separate navigation apparatus (not illustrated). Here, the navigation information may include set destination information, destination based routing information, and map information or vehicle location information related to vehicle traveling.

The vehicle control device 400 may be understood as included in the vehicle 700.

FIG. 3 is an internal block diagram illustrating one example of the vehicle control device 400 according to an exemplary embodiment of the present invention. Referring to FIG. 3, the vehicle control device 400 may include an input unit 410, a communication unit 420, an interface 430, a memory 440 a camera 460, a sensor unit 450, a processor 470, an audio output unit 485, and a power supply unit 490. The vehicle control device 400 may include additional components in addition to the above-described components, or some of the above-described components may be omitted. Here, units of the same names, among the units included in the vehicle control device 400 and the units included in the vehicle 700 may be included in the vehicle 700 or the vehicle control device 400.

The vehicle control device 400 may include the input unit 410 for receiving user input. For example, a user may input settings for a sliding function provided by the vehicle control device 400 through the input unit 410, or may input execution of power on/off of the vehicle control device 400.

The input unit 410 may include at least one of a gesture input unit (e.g., an optical sensor, etc.) for sensing a user gesture, a touch input unit (e.g., a touch sensor, a touch key, a push key (mechanical key), etc.) for sensing touch, and a microphone for sensing voice input and receive user input.

Next, the vehicle control device 400 may include the communication unit 420 for communicating with another vehicle 510, a terminal 600 and a server 500. The communication unit 420 may be referred to as a wireless communication unit 420.

The vehicle control device 400 may receive communication information including at least one of navigation information, another vehicle 510's traveling information, and traffic information through the communication unit 420. The vehicle control device 400 may send information about the vehicle 700 through the communication unit 420.

The communication unit 420 may receive at least one of position information, weather information and road traffic condition information (e.g., transport protocol experts group (TPEG), etc.) from the mobile terminal 600 and/or the server 500.

The communication unit 420 may receive traffic information from the server 500 having an intelligent traffic system (ITS). Here, the traffic information may include traffic signal information, lane information, vehicle surrounding information or position information.

In addition, the communication unit 420 may receive navigation information from the server 500 and/or the mobile terminal 600. Here, the navigation information may include at least one of map information related to vehicle driving, lane information, vehicle position information, set destination information and route information according to the destination.

For example, the communication unit 420 may receive the real-time position of the vehicle as the navigation information. In detail, the communication unit 420 may include a global positioning system (GPS) module and/or a Wi-Fi (Wireless Fidelity) module and acquire the position of the vehicle.

In addition, the communication unit 420 may receive driving information of another vehicle 510 from the another vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the vehicle control device 400 may pair with each other automatically or by executing a user application.

The communication unit 420 may exchange data with the another vehicle 510, the mobile terminal 600 or the server 500 in a wireless manner. The communication unit 420 may perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 420 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The communication unit 420 is configured to facilitate short-range communication. For example, short-range communication may be supported using at least one of Bluetooth™ Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the vehicle control device 400 may pair with the mobile terminal located inside the vehicle using a short-range communication method and wirelessly exchange data with the other vehicle 510 or the server 500 using a long-distance wireless communication module of the mobile terminal.

Next, the vehicle control device 400 may include the interface 430 for receiving data of the vehicle 700 and transmitting a signal processed or generated by the processor 470.

The vehicle control device 400 may receive at least one of driving information of another vehicle, navigation information and sensor information via the interface 430.

To this end, the interface 430 may perform data communication with at least one of the controller 770 of the vehicle, an audio-video-navigation (AVN) apparatus 300, and the sensing unit 760 using a wired or wireless communication method. The interface 430 may receive navigation information by data communication with the controller 770, the AVN apparatus 300 and/or a separate navigation apparatus. In addition, the interface 430 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor using handle rotation, a vehicle inside temperature sensor, a vehicle inside humidity sensor, a door sensor, etc. The position module may include a GPS module for receiving GPS information.

The interface 430 may receive user input via the user input unit 410 of the vehicle. The interface 430 may receive user input from the input unit of the vehicle or via the controller 770. That is, when the input unit is provided in the vehicle, user input may be received via the interface 430.

In addition, the interface 430 may receive traffic information acquired from the server. The server 500 may be located at a traffic control surveillance center for controlling traffic. For example, when traffic information is received from the server 500 via the communication unit 420 of the vehicle, the interface 430 may receive traffic information from the controller 770.

Next, the memory 440 may store a variety of data for overall operation of the vehicle control device 400, such as a program for processing or control of the processor 470.

In addition, the memory 440 may store data and commands for operation of the vehicle control device 400 and a plurality of application programs or applications executed in the vehicle control device 400. At least some of such application programs may be downloaded from an external server through wireless communication. At least some of such application programs may be installed in the vehicle control device 400 upon release. Such application programs may be stored in the memory 440, and may be executed to perform operation (or function) of the vehicle control device 400 by the processor 470.

The memory 440 may store data for checking an object included in an image. For example, the memory 440 may store data for checking a predetermined object using a predetermined algorithm when the predetermined object is detected from an image of the vicinity of the vehicle acquired through the camera 460. For example, the memory 440 may store data for checking a predetermined object such as a passenger, garbage, or a lost item from an image acquired through the camera 460.

The memory 440 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle control device 400 may operate in association with a web storage for performing a storage function of the memory 440 over the Internet.

The sensor unit 450 may acquire information on the internal state of the vehicle 700. The sensor unit 450 may sense an object or thing within the vehicle 700. Alternatively, the camera 460 may capture a passenger in the vehicle 700.

The camera 460 may capture the inside of the vehicle 700. The camera 460 may capture the surroundings of the vehicle control device 400. Alternatively, the camera 460 may capture the surroundings of a seat where the vehicle control device 400 is installed. Alternatively, the camera 460 may capture a passenger in the seat.

A display unit 180 may commonly refer to a display device installed inside the vehicle. The display unit 180 may be referred to as a display 180 or a display device 180.

The processor 470 may be referred to as a control unit 470 or a controller 470. The processor 470 may detect an object in the vicinity of the vehicle control device 400 through the camera 460. Alternatively, the processor 470 may detect a passenger, the passenger's gaze, or the passenger's movement through the camera 460. The processor 470 may control a voice recognition unit 481.

FIG. 4 shows an example of basic operations of an autonomous vehicle and 5G network in a 5G communication system.

The autonomous vehicle transmits specific information to a 5G network (S1).

The specific information may include autonomous driving-related information.

The autonomous driving-related information may be information directly related to vehicle driving control. For example, the autonomous driving-related information may include one or more of object data indicating an object around the vehicle, map data, vehicle status data, vehicle location data, and driving plan data.

The autonomous driving-related information may further include service information, etc. that may be provided in an autonomous driving process. For example, the service information may be a passenger's seat use information or a passenger's service use information which is acquired through a camera inside the vehicle. The 5G network may determine whether to remotely control the vehicle (S2).

As stated above, information related to the remote control may be a signal applied directly to the autonomous vehicle, and may further service information provided to a passenger inside the vehicle in an autonomous driving process. In one embodiment of the present invention, the autonomous vehicle may provide passenger management service through the 5G network by matching seat use information of a passenger inside the vehicle and the passenger' service use information. Here, the 5G network may include a server or module that performs autonomous driving-related remote control.

The 5G network may transmit information (or signal) related to remote control to the autonomous vehicle (S3).

FIG. 5 shows an example of application operations of an autonomous vehicle and 5G network in a 5G communication system.

The autonomous vehicle performs an initial access procedure with a 5G network (S20).

The initial access procedure may include a cell search for acquiring a downlink (DL) operation, a process of acquiring system information, and so on, which will be described more concretely in the paragraph F.

Then, the autonomous vehicle performs a random access procedure with the 5G network (S21).

The random access process includes preamble transmission and random access response reception processes for acquiring uplink (UL) synchronization or transmitting UL data, which will be described more concretely in the paragraph G.

Then, the 5G network transmits a UL Grant for scheduling transmission of specific information to the autonomous vehicle (S22).

Reception of the UL grant includes a process for time/frequency resource scheduling to transmit UL data, which will be described more concretely in the paragraph H.

Then, the autonomous vehicle transmits specific information to the 5G network based on the UL grant (S23).

Then, the 5G network determines whether to remotely control the vehicle (S24).

Then, the autonomous vehicle receives a DL grant through a physical downlink control channel in order to receive a response to the specific information from the 5G network (S25).

Then, the 5G network transmits information (or signal) related to remote control to the autonomous vehicle based on the DL grant (S26).

Meanwhile, although FIG. 7 illustrates an example of a combination of an initial access process of an autonomous vehicle and 5G communication and/or random access process and a downlink grant reception process through the steps S20 to S26, the present invention is not limited to this.

For example, the initial access process and/or random access process may be performed through the steps S20, S22, S23, S24, and S26. For example, the initial access process and/or random access process may be performed through the steps S21, S22, S23, S24, and S26. Also, a combination of an AI operation and a downlink grant reception process may be performed through the steps S23, S24, S25, and S26.

FIG. 6 illustrates an autonomous vehicle operation through S20 to S26, but the present invention is not limited to this.

For example, the autonomous vehicle operation may be performed by selectively combining S20, S21, S22, and S25 with S23 and S26. Also, for example, the autonomous vehicle operation may consist of S21, S22, S23, and S26. Also, for example, the autonomous vehicle operation may consist of S20, S21, S23, and S26. Also, for example, the autonomous vehicle operation may consist of S22, S23, S25, and S26.

FIGS. 7 to 9 show an example of an autonomous vehicle operation using 5G communication.

First of all, referring to FIG. 7, an autonomous vehicle including an autonomous driving module performs an initial access procedure with a 5G network based on a SSB (synchronization signal block), in order to acquire DL synchronization and system information (S30).

Then, the autonomous vehicle performs a random access procedure with the 5G network to acquire UL synchronization and/or transmit UL (S31).

Then, the autonomous vehicle receives a UL grant from the 5G network in order to transmit specific information (S32).

Then, the autonomous vehicle transmits specific information to the 5G network based on the UL grant (S33).

Then, the autonomous vehicle receives a DL grant from the 5G network to receive a response to the specific information (S34).

Then, the autonomous vehicle receives information (or signal) related to remote control from the 5G network based on the DL grant (S35).

A beam management (BM) process may be added to S30, a beam failure recovery process related to PRACH (physical random access channel) transmission may be added to S31, a QCL relationship may be added to S32 in relation to the direction of beam reception of a PDCCH carrying a UL grant, and a QCL relationship may be added to S33 in relation to the direction of beam transmission of a PUCCH (physical uplink control channel)/PUSCH (physical uplink shared channel) carrying specific information. Also, a QCL relationship may be added to S34 in relation to the direction of beam reception of a PDCCH carrying a DL grant. A more detailed description of this will be given in the paragraph I.

Next, referring to FIG. 7, an autonomous vehicle performs an initial access procedure with a 5G network based on a SSB, in order to acquire DL synchronization and system information (S40).

Then, the autonomous vehicle performs a random access procedure with the 5G network to acquire UL synchronization and/or transmit UL (S41).

Then, the autonomous vehicle transmits specific information to the 5G network based a configured grant (S42). A process of receiving the configured grant, instead of a process of receiving a UL grant from the 5G network, will be described more concretely in the paragraph H.

Then, the autonomous vehicle receives information (or signal) related to remote control from the 5G network based on the configured grant (S43).

Next, referring to FIG. 7, an autonomous vehicle performs an initial access procedure with a 5G network based on a SSB, in order to acquire DL synchronization and system information (S50).

Then, the autonomous vehicle performs a random access procedure with the 5G network to acquire UL synchronization and/or transmit UL (S51).

Then, the autonomous vehicle receives a DownlinkPreemption IE from the 5G network (S52).

Then, the autonomous vehicle receives a DCI format 2_1 carrying a preemption indication from the 5G network based on the DownlinkPreemption IE (S53).

Then, the autonomous vehicle does not perform (or expect or assume) reception of eMBB data on resources (PRB and/or OFDM symbol) indicated by the pre-emption indication (S54).

An operation related to the preemption indication will be described more concretely in the paragraph J.

Then, the autonomous vehicle receives a UL grant from the 5G network in order to transmit specific information (S55).

Then, the autonomous vehicle transmits specific information to the 5G network based on the UL grant (S56).

Then, the autonomous vehicle receives a DL grant from the 5G network to receive a response to the specific information (S57).

Then, the autonomous vehicle receives information (or signal) related to remote control from the 5G network based on the DL grant (S58).

Next, referring to FIG. 9, an autonomous vehicle performs an initial access procedure with a 5G network based on a SSB, in order to acquire DL synchronization and system information (S60).

Then, the autonomous vehicle performs a random access procedure with the 5G network to acquire UL synchronization and/or transmit UL (S61).

Then, the autonomous vehicle receives a UL grant from the 5G network in order to transmit specific information (S62).

The UL grant carries information on the number of repetitions of transmission of the specific information, and the specific information is repeatedly transmitted based on the information on the number of repetitions (S63).

Then, the autonomous vehicle transmits specific information to the 5G network based on the UL grant.

Also, repeated transmission of specific information is performed by frequency hopping, and first specific information may be transmitted on a first frequency resource and second specific information may be transmitted on a second frequency resource.

The specific information may be transmitted over a narrowband of 6RB (Resource Block) or 1RB (Resource Block).

Then, the autonomous vehicle receives a DL grant from the 5G network to receive a response to the specific information (S64).

Then, the autonomous vehicle receives information (or signal) related to remote control from the 5G network based on the DL grant (S65).

Referring to FIG. 10, the vehicle 700 may drive autonomously. The driving mode of the vehicle 700 may include a manual driving mode, a semi-autonomous driving mode, an autonomous driving mode, and the like. The manual driving mode may mean that the driving of the vehicle 700 is performed from the operation of the driver. The self-running mode may mean that the vehicle 700 travels without the driver's operation. The autonomous mode may also be referred to as an autonomous mode. The semiautomatic running mode may mean that part of the running of the vehicle 700 is performed by the operation of the driver and the remainder of the running of the vehicle 700 is performed without the driver's operation. Alternatively, the processor 470 may control driving of the vehicle 700 with the driving control right of the vehicle 700. The driving control right includes steering control of the vehicle 700, acceleration control of the vehicle 700, shift control of the vehicle 700, brake control of the vehicle 700, light control of the vehicle 700, and wiper of the vehicle 700. It may include at least one of the control. When the driving control right is transferred to the occupant, the driving mode of the vehicle 700 may be changed into a semi-autonomous driving mode or a manual driving mode.

The processor 470 may receive pre-boarding reservation input information of the vehicle 700 from the occupant. The occupant can input the reservation input information to the mobile terminal 600 and the processor 470 can receive the reservation input information from the mobile terminal 600 through the server 500 or the network.

The reservation input information may include at least one of whether to agree to transfer the driving control right, whether to hold a driver's license, whether to drink, driving history, seat selection information, use time, ride time, get off time, ride position, and get off position.

FIGS. 11 to 14 are views showing an exemplary embodiment in which a display region is personalized based on physical features of a passenger in a vehicle 700.

Referring to FIG. 11, the processor 470 may detect the face of a passenger sitting in a seat of the vehicle 700 by a camera 460 installed in the vehicle 700 (S1410). The camera 460 may capture the inside of the vehicle 700 and the area around the seat. Alternatively, the processor 470 may capture a person approaching the vehicle 700 to board the vehicle 700 by the camera 460. The camera 460 may capture the outside of the vehicle 700.

The processor 470 may detect the face of the passenger by the camera 460 installed in the vehicle 700. Alternatively, the passenger's face may be detected outside or inside the vehicle 700.

In this instance, the processor 470 may determine whether the detected passenger has an existing boarding record or not. If the passenger has an existing boarding record, the processor 470 may load the passenger's information. The passenger's information may be loaded from the memory 440 or received from the outside through a communication unit.

The processor 470 may estimate the face height from the floor surface of the vehicle 700 (S1420). Alternatively, if the passenger's face is detected outside the vehicle 700, the processor 470 may estimate the face height from the ground. Alternatively, the processor 470 may estimate to may estimate the passenger's height, the eye height, or the height of a specific part on the face, instead of the height of the passenger's face.

The processor 470 may determine whether the estimated face height is higher than a predetermined level (S1430). The predetermined level may vary depending on the type of the vehicle 700 or how a display is installed in the vehicle 700. The predetermined level may vary depending on whether the passenger is sitting or standing.

If the estimated face height is lower than the predetermined level, the processor 470 may set a display region on a first display installed in front of the seat the passenger is sitting in (S1440). The first display may be a personal display installed on the passenger's seat. If the estimated face height is low, this means that the passenger may be short or the eye height may be low. Therefore, setting a display region on a personal display and displaying images there will make it convenient for the passenger to watch the images.

If the estimated face height is higher than the predetermined level, the processor 470 may set a display region on at least part of a second display positioned in front of the first display (S1450). The second display may be a front window of the vehicle 700. The second display may be a transparent OLED display. Alternatively, the second display may be a display positioned on the front window of the vehicle 700. The second display may be positioned farther away from the seat than the first display. The second display may be larger in size than the first display. Also, the second display may be positioned higher than the first display. The second display may be a shared display for multiple passengers in the vehicle 700. If the estimated face height is high, this means that the passenger may be tall or the eye height may be high. Therefore, setting a display region on at least part of the second display and displaying images there will allow the passenger to see far ahead and high above, thereby making it convenient for the passenger to watch the images.

The processor 470 may display images in the set display region (S1460). The set display region may display images for the passenger. The passenger may give image display input and control commands in the display region to have their desired content displayed in the display region.

Referring to FIGS. 12 and 13, a plurality of seats 901*a*, 901*b*, 902*a*, and 902*b* may be installed in the vehicle 700. First displays 901*a*1, 901*b*1, 902*a*1, and 902*b*1 may be respectively installed on the seats 901*a*, 902*b*, 902*a*, and 902*b*. A second display 910 may be installed at the front of the vehicle 700. The second display 910 may be a shared display.

The processor 470 may detect a passenger 900*a* by a camera 460. If the passenger 900*a* is standing, the processor 470 may estimate the face height while the passenger 900*a* is standing. Alternatively, if the passenger 900*a* is sitting, the processor 470 may detect the passenger 900*a* sitting and estimate the face height.

In this instance, the processor 470 may determine whether the detected passenger 900*a* has an existing boarding record or not. If the passenger 900*a* has an existing boarding record, the processor 470 may load the passenger 900*a*'s information I1. The passenger 900*a*'s information may be loaded from the memory 440 or received from the outside through a communication unit 420.

Alternatively, upon receiving an input for setting a display region from the passenger, the processor 470 may set a display region based on the received input.

Referring to (a) of FIG. 14, if the passenger's face height is lower than a preset level, the processor 470 may set a display region D1 on the first display 901*a*1. Referring to (b) of FIG. 14, if the passenger's face is higher than the preset level, the processor 470 may set a display region D2 on part of the second display 910.

FIGS. 15 to 17 are views of an exemplary embodiment showing how a display region is changed according to changes in a passenger's state.

Referring to FIG. 15, the processor 470 may set a display region on the first display (S1610). The processor 470 may detect a tilt of the backrest of the seat. Alternatively, the processor 470 may detect a change in the center of gravity by a weight sensor installed on the seat. Alternatively, the processor 470 may detect a shift in the passenger's posture by a camera 460 for capturing the seat (S1620).

The processor 470 may detect a change in the passenger's face height or a change in the direction of gaze by the camera 460 as the backrest of the seat is tilted. As the center of gravity of the seat changes, the processor 470 may detect a change in the passenger's face height or a change in the direction of gaze by the camera 460. By detecting a change in the passenger's posture, the processor 470 may detect a change in the passenger's face height or a change in the direction of gaze by the camera 460.

The processor 470 may adjust the position and direction of the first display in response to a change in the passenger's state (S1630). For example, the processor 470 may raise the height of the first display when the backrest of the seat is tilted. Alternatively, the processor 470 may tilt the first display in the direction the seat is tilted when the backrest of the seat is tilted. Alternatively, the processor 470 may vary the angle of the first display toward the seat when the backrest of the seat is tilted. Alternatively, the processor 470 may tilt the first display in the direction the seat is tilted.

Referring to FIG. 16, the processor 470 may set a display region on the first display (S1710). The processor 470 may detect a tilt of the backrest of the seat. Also, the processor 470 may detect the backrest of the seat being tilted back more than a preset reference angle (S1720).

Upon detecting the backrest of the seat being tilted back more than the preset reference angle, the processor 470 may deactivate the display region set on the first display and set a new display region on at least part of the second display (S1730). Alternatively, upon detecting the backrest of the seat being tilted back more than the preset reference angle, the processor 470 may move the display region set on the first display to at least part of the second display.

Referring to (a) of FIG. 17, the processor 470 may raise the height of the first display 901a1 when the backrest of the seat is tilted. Alternatively, the processor 470 may tilt the first display 901a1 in the direction the seat is tilted when the backrest of the seat is tilted. Alternatively, the processor 470 may vary the angle of the first display 901a1 toward the seat when the backrest of the seat is tilted. Alternatively, the processor 470 may tilt the first display 901a1 in the direction the seat is tilted.

Referring to (b) of FIG. 17, upon detecting the backrest of the seat being tilted back more than a preset reference angle, the processor 470 may deactivate the display region set on the first display 901a1 and set a new display region D3 on at least part of the second display 910. Alternatively, upon detecting the backrest of the seat being tilted back more than the preset reference angle, the processor 470 may move the display region set on the first display 901a1 to at least part of the second display 910. When the backrest of the seat is tilted back more than the preset reference angle, the passenger's direction of gaze may be a direction in which they look at the second display 910. Accordingly, the passenger's convenience may be enhanced by setting the display region D3 on the second display 910.

Referring to FIG. 18, the second seat 901b may be positioned to one side of the first seat 901a. The first seat 901a and the second seat 901b may be positioned to face the second display 910.

Referring (a) of FIG. 18, no one may be sitting in the second seat 901b, and the first passenger 900a may be sitting in the first seat 901a. Referring (b) of FIG. 18, the second passenger 900b may be sitting in the second seat 901b. The respective display regions of the first passenger 900a and second passenger 900b may be the first displays 901a1 and 901b1. The processor 470 may rotate or pivot the first display 901a1 of the first passenger 900a toward the first passenger 900a. The processor 470 may rotate or pivot the first display 901b1 of the second passenger 900b toward the second passenger 900b. Due to this, the display region for the second passenger 900b may not come into the first passenger 900a's view, and the display for the first passenger 900a may not come into the second passenger 900b's view.

Alternatively, the first displays may have their respective films. The films may be called passivation films or protective films. When the films become active, the angle of view of the first displays may be narrowed. Upon detecting the second passenger sitting in the second seat positioned to one side of the first seat, the processor 470 may activate the film of the first display and the film of the second display.

FIGS. 19 and 20 are views of an exemplary embodiment showing how a display region is changed according to changes in a passenger's state.

Referring to FIG. 19, the processor 470 may set a display region on the second display (S2010). The processor 470 may detect a tilt of the backrest of the seat. Alternatively, the processor 470 may detect a change in the center of gravity by a weight sensor installed on the seat. Alternatively, the processor 470 may detect a shift in the passenger's posture by a camera 460 for capturing the seat (S2020).

The processor 470 may detect a change in the passenger's face height or a change in the direction of gaze by the camera 460 as the backrest of the seat is tilted. As the center of gravity of the seat changes, the processor 470 may detect a change in the passenger's face height or a change in the direction of gaze by the camera 460. By detecting a change in the passenger's posture, the processor 470 may detect a change in the passenger's face height or a change in the direction of gaze by the camera 460.

Upon detecting a change in the passenger's state, the processor 270 may move the display region set on the second display up or down (S2030). Alternatively, upon detecting a change in the passenger's state, the processor 470 may move the display region set on the second display left or right (S2030). The second display may be a stationary display.

Alternatively, upon detecting a change in the passenger's state after setting a display region on at least part of the second display, the processor 470 may then set a new display region on the first display. For example, the processor 470 may move the display region from one area of the second display to the first display.

Referring to FIG. 20, the processor 470 may detect a change in the passenger 900a's direction of gaze, a change in their eye height, or a change in their face height when the seat 901a is tilted back. The processor 470 may deactivate the existing display region D4 and set a new display region D5. The new display region D5 may be positioned higher than the existing display region D4.

If the second display is a transparent display, the second display may allow light from outside the vehicle 700 to pass through. The processor 470 may detect the brightness of the outside world by a camera 460 for capturing the outside of the vehicle 700. The processor 470 may adjust the light transmittance of a set display region based on the brightness of the outside world. For example, the processor 470 may increase visibility by lowering the light transmittance of a set display region.

Referring to (a) of FIG. 21, the first passenger 900a may be sitting in the first seat 901a, and the second passenger 900b may be sitting in the second seat 901b. A display region D6 for the first passenger 900a may be set in one area of the second display 910. A display region D7 for the second passenger 900b may be set in another area of the second display 910. In this case, if the first passenger 900a and the second passenger 900b are traveling together, or the first passenger 900a and the second passenger 900b are watching the same content, the display region D6 for the first passenger 900a and the display region D7 for the second passenger 900b may be combined.

Referring to (b) of FIG. 21, upon getting approval from the first passenger 900a and second passenger 900b to combine the display regions or receiving an input for combining the display regions, the processor 470 may combine the display region D6 for the first passenger 900a and the display region D7 for the second passenger 900b. The area of the combined display region D8 may be larger than the sum of the area of the display region D6 for the first passenger 900a and the area of the display region D7 for the second passenger 900b. The combined display region D8 may display content, and the first passenger 900a and the second passenger 900b may watch the combined display region D8.

The vehicle control device according to the foregoing exemplary embodiment of the present invention may enhance passengers' convenience. The vehicle control device according to the foregoing exemplary embodiment of the present invention may be used while a vehicle is driving autonomously or semi-autonomously.

The features, structures, and effects described in the above embodiments are included in at least one embodiment of the present invention, and are not necessarily limited to only one embodiment. Moreover, the features, structures, and effects described in the embodiments may also be combined or modified to be carried out in other embodiments by those skilled in the art to which the embodiments pertain. Thus, the contents related to the combination and modification shall be construed to be included in the scope of the present invention.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For example, the constituent elements described in detail in the exemplary embodiments can be modified to be carried out. Further, the differences related to such modifications and applications shall be construed to be included in the scope of the present invention specified in the attached claims.

The invention claimed is:

1. A vehicle control method for a vehicle that includes a seat, a first display positioned in front of the seat and facing the seat, and a second display positioned in front of the first display and facing the seat, the vehicle control method comprising:
    detecting the face of a passenger sitting in the seat by a camera installed in the vehicle;
    estimating the face height from the floor surface of the vehicle;
    based on the estimated face height being lower than a predetermined level, setting a display region on the first display, and, based on the estimated face height being higher than the predetermined level, setting a display region on at least part of the second display; and
    displaying images in the set display region,
    wherein the vehicle control method further comprises:
        based on a determination that a first passenger and a second passenger watch a same content through different display regions in the second display, combining the different display regions into one display region in the second display, the first passenger being the passenger, the second passenger sitting in a second seat to one side of a first seat which is the seat, and an area of the one display region being larger than a sum of areas of the different display regions.

2. The vehicle control method of claim 1, further comprising, based on detecting a tilt of the backrest of the seat after the display region is set on the first display, moving the position of the first display up or down.

3. The vehicle control method of claim 1, further comprising, based on detecting a tilt of the backrest of the seat after the display region is set on the first display, varying the angle of the first display toward the seat.

4. The vehicle control method of claim 1, further comprising, based on detecting the backrest of the seat being tilted back more than a preset reference angle, after the display region is set on the first display, setting a new display region on at least part of the second display.

5. The vehicle control method of claim 1, further comprising, based on detecting a change in the passenger's direction of gaze by the camera, after the display region is set on the first display, changing the position of the first display based on the change in the passenger's direction of gaze.

6. The vehicle control method of claim 1, further comprising, based on detecting a change in the passenger's posture by the camera after the display region is set on the first display, changing the position of the first display based on the change in posture.

7. The vehicle control method of claim 1, further comprising, based on detecting a change in the center of gravity of the seat by a weight sensor installed on the seat, after the display region is set on the first display, changing the position of the first display based on the change in center of gravity.

8. The vehicle control method of claim 1, further comprising, based on detecting a tilt of the backrest of the seat after the display region is set on the second display, moving the display region up or down.

9. The vehicle control method of claim 1, further comprising, based on detecting a change in the center of gravity of the seat by a weight sensor installed on the seat, after the display region is set on the second display, changing the position of the first display based on the change in center of gravity.

10. The vehicle control method of claim 1, further comprising:
    detecting the brightness outside the vehicle; and
    adjusting the brightness of the display region based on the detected brightness.

11. The vehicle control method of claim 1, further comprising:
    detecting the brightness outside the vehicle; and
    based on the display region being set on the second display, adjusting the light transmittance of the second display based on the detected brightness.

12. The vehicle control method of claim 1, further comprising:
    detecting the second passenger by the camera; and
    based on the display region being set on the first display, rotating or pivoting the first display toward the first seat after detecting the second passenger.

13. The vehicle control method of claim 1, further comprising:
    detecting the second passenger by the camera; and
    based on the display region being set on the first, activating a film that covers the first display and narrowing the angle of view of the first display after detecting the second passenger.

14. The vehicle control method of claim 1, further comprising, based on receiving an input for setting a display region, setting the display region according to the input.

15. The vehicle control method of claim 1, further comprising, based on the detected face of the passenger is stored face information and there is display region information corresponding the stored face information, setting the display region according to the display region information.

16. A vehicle control apparatus for a vehicle that includes a seat, a first display positioned in front of the seat and facing the seat, and a second display positioned in front of the first display and facing the seat, the vehicle control apparatus comprising:

at least one processor; and at least one computer-readable memory storing instructions that, based on being executed by the at least one processor, perform operations comprising:

detecting the face of a passenger sitting in the seat by a camera installed in the vehicle;

estimating the face height from the floor surface of the vehicle;

based on the estimated face height being lower than a predetermined level, setting a display region on the first display, and, based on the estimated face height being higher than the predetermined level, setting a display region on at least part of the second display; and displaying images in the set display region, wherein the operations further comprise:

based on a determination that a first passenger and a second passenger watch a same content through different display regions in the second display, combining the different display regions into one display region in the second display, the first passenger being the passenger, the second passenger sitting in a second seat to one side of a first seat which is the seat, and an area of the one display region being larger than a sum of areas of the different display regions.

* * * * *